US005886755A

United States Patent [19]

Imoto et al.

[11] Patent Number: 5,886,755

[45] Date of Patent: Mar. 23, 1999

[54] LIQUID CRYSTAL DISPLAY DEVICE

[75] Inventors: Satoshi Imoto; Heihachiro Ebihara, both of Tanashi, Japan

[73] Assignee: Citizen Watch Co., Ltd., Tokyo, Japan

[21] Appl. No.: 836,737

[22] PCT Filed: Sep. 18, 1996

[86] PCT No.: PCT/JP96/02683

§ 371 Date: Jul. 10, 1997

§ 102(e) Date: Jul. 10, 1997

[87] PCT Pub. No.: WO97/11403

PCT Pub. Date: Mar. 27, 1997

[30] Foreign Application Priority Data

Sep. 18, 1995 [JP] Japan .................................... 7-238366

[51] Int. Cl.[6] .............................. G02F 1/133; G02F 1/37; G09G 3/36

[52] U.S. Cl. ................................ 349/37; 349/34; 349/174

[58] Field of Search ................................ 349/33, 34, 37, 349/174; 345/97, 101

[56] References Cited

U.S. PATENT DOCUMENTS 5,367,391 11/1994 Johno et al. .............................. 349/37
5,459,481 10/1995 Tanaka et al. ............................ 345/95
5,598,284 1/1997 Kogushi et al. .......................... 349/38

FOREIGN PATENT DOCUMENTS 4-249290 9/1992 Japan .
4-311919 11/1992 Japan .
4-311920 11/1992 Japan .
4-311921 11/1992 Japan .
4-311922 11/1992 Japan .
4-371919 12/1992 Japan .
6-214215 8/1994 Japan .

OTHER PUBLICATIONS

Patent Abstracts of Japan, vol. 17, No. 239 (P–1534), 13 May 1993 & JP 04 0362990 A (Seiko Epson Co.), 15 Dec. 1992 Abstract.

K. Shimizu et al.: "Matrix Addressing of Ferroelectric Liquid–Crystal Displays" Proceedings Of The SID., vol. 28, No. 2, 1987, Playa Del Rey, CA, US, pp. 211–216 XP000001274 *whole article*.

*Primary Examiner*—William L. Sikes
*Assistant Examiner*—Kenneth Parker
*Attorney, Agent, or Firm*—Finnegan, Henderson, Farabow, Garrett & Dunner, L.L.P.

[57] ABSTRACT

The present invention relates to an antiferroelectric liquid crystal display device, by which a time (namely, a ferroelectric saturation time tr) required for transition of the state of a liquid crystal, which has been in a dark state, to a saturated bright state is reduced. A method of establishing a precedent driving period in such a manner as to be precedent to a selective driving period and of obtaining a value, at which the ferroelectric saturation time tr is minimized, of a synthetic voltage from a scanning signal and a display signal in the precedent driving period. A device using the value obtained by this method. In the precedent driving period, a voltage, whose voltage value is |Vx|, is applied to the liquid crystal. In a selective driving period, a voltage, which is different in polarity from the voltage value |Vx| and has a voltage value is |Vz|, is applied thereto. In other periods, a voltage having a voltage value of 0 is applied thereto. A value of the voltage |Vx|, at which the ferroelectric saturation time tr is minimized when changing the value of the voltage |Vx| while maintaining the voltage |Vz| at a constant value, is set as an optimum precedent driving voltage |VM|.

10 Claims, 11 Drawing Sheets

(a)

(b)

LIQUID CRYSTAL DISPLAY DEVICE

TECHNICAL FIELD

The present invention relates to a method of obtaining an optimum preceding driving voltage in a liquid crystal display device using an antiferroelectric liquid crystal display panel that has a plurality of column electrodes and a plurality of row electrodes, and to an antiferroelectric liquid crystal display device using this method.

BACKGROUND ART

An antiferroelectric liquid crystal is stable in an antiferroelectric state when left in a condition that no voltage (zero) is applied to the liquid crystal. Hereinafter, this stable state will be referred to as a neutral state. An antiferroelectric liquid crystal panel may be configured in such a manner as to effect either a dark display or a bright display in the aforesaid neutral state. An antiferroelectric liquid crystal panel of the present invention be applied to both a dark display and a bright display. An antiferroelectric liquid crystal panel which is adapted to effect a dark display in the neutral state, will be described in the following description. However, in the case of an antiferroelectric liquid crystal panel which is adapted to effect a bright display in the neutral state, read “bright” for “dark”, and vice versa in the following description.

It is explained that generally, an antiferroelectric liquid crystal has two states, namely, an antiferroelectric state (namely, a dark state) and a ferroelectric state (namely, a bright state), that when a voltage is applied to a liquid crystal panel, the entirety of which has been in the antiferroelectric state, a phase transition therefrom to the ferroelectric state first occurs in micro portions, that the proportion of portions, whose phases are changed into the ferroelectric state, increases with time and that finally the phase of the entire panel is changed into the ferroelectric state and thus the entire panel changes the state thereof into a saturated ferroelectric state.

When zero voltage is applied to a liquid crystal panel, the entirety of which has been in the ferroelectric state, in a similar way, a phase transition therefrom to the antiferroelectric state first occurs in micro portions, that the proportion of portions, whose phases are changed into the antiferroelectric state, increases with time and that, finally, the phase of the entire panel is changed into the antiferroelectric state and thus the entire panel changes the state thereof into the neutral state.

FIG. 1(*a*) is an example of a graph illustrating the optical transmittance of an antiferroelectric liquid crystal versus a voltage applied thereto. In this graph, the axis of abscissa represents the applied voltage; and the axis of ordinates represents the optical transmittance.

When applying a positive voltage to the crystal, which has been in the neutral state at a point O, and increasing the positive voltage, the transmittance abruptly increases at a voltage Ft. Then, the transmittance reaches nearly the maximum value at a voltage Fs, and the crystal changes the state thereof into the saturated ferroelectric state. Thence, the optical transmittance does not change much even when a higher voltage is applied thereto. Next, when the applied voltage is gradually decreased, the optical transmittance abruptly drops at a voltage At. Further, the transmittance nearly reaches zero at the voltage As, and the state of the crystal returns to an antiferroelectric state. Similarly, if a negative voltage is applied to the crystal from the voltage 0, the transmittance abruptly rises at a voltage (−Ft). Then, the transmittance nearly reaches the maximum value at a voltage (−Fs), and the crystal changes the state thereof into the saturated ferroelectric state. Thence, when the applied negative voltage is gradually reduced to 0 V, the transmittance abruptly drops at a voltage (−At). Further, the transmittance becomes almost zero at a voltage (−As), and, the crystal returns to the antiferroelectric state. As above described, there are two ferroelectric states of the liquid crystal, which are the ferroelectric state caused by the application of the positive voltage and the ferroelectric state caused by the application of the negative voltage. Hereunder, the ferroelectric state caused in the former case will be referred to as the (+) ferroelectric state, while the ferroelectric state caused in the latter case will be referred to as the (−) ferroelectric state. Further, $|Ft|$ designates a ferroelectric threshold voltage; $|FS|$ a ferroelectric saturation voltage; $|At|$ designates an antiferroelectric threshold voltage; and $|As|$ an antiferroelectric saturation voltage.

Incidentally, the values of each of the aforementioned ferroelectric threshold voltage $|Ft|$, the aforementioned ferroelectric saturation voltage $|FS|$, the aforementioned antiferroelectric threshold voltage $|At|$ and the aforementioned antiferroelectric saturation voltage $|As|$ in the (+) ferroelectric side is sometimes slightly different from the value thereof in the (−) ferroelectric side. However, for simplicity of description, the following description will be made by assuming that each of these voltage has the same value. To make a correction on the driving voltages respectively corresponding to the (+) ferroelectric side and the (−) ferroelectric side as needed is within the scope of the present invention.

Generally, it is the case that the curves (namely, hysteresis curves) of FIG. 1(*a*) representing the optical transmittance characteristics of a liquid crystal versus the voltage applied thereto are obtained by applying thereto a triangular-wave-like voltage in which the absolute value of the ratio of a change in this voltage relative to time, namely, the value of $|dV/dt|$ is constant. However, in this case, if the value of $|dV/dt|$ is changed, the shapes of the hysteresis curves also change. Moreover, the values of the aforementioned values As, Ft, Fs and At also vary. It is, accordingly, necessary to define the aforesaid value of $|dV/dt|$ to specify these values. However, the inventors obtained data concerning the graph of FIG. 1(*a*) by the following method (hereunder referred to as a time fixation method 1) so as to obtain values closely corresponding to actual driving conditions.

It is assumed that the length of a time period, in which a selection voltage (to be described later) is applied to a display device at a working temperature, is Wt.

(1) A pulse voltage, whose duration is Wt and voltage level is Vx, is applied to the liquid crystal that is in a stable antiferroelectric state (namely, in the neutral state). Further, the relationship between the optical transmittance and the pulse voltage Vx at the time of completion of the application of this pulse voltage is plotted. When this operation is repeated by changing the value of the voltage Vx, the curve drawn from the point O to Fs through Ft of FIG. 1(*a*), as well as the curve drawn from the point O to (−Fs) through (−Ft), is obtained.

(2) Next, the liquid crystal is first put into the saturated ferroelectric state by applying thereto a voltage which is not lower than the aforementioned voltage $|FS|$. Then, at a moment 0, the applied voltage is reduced to $|Vz|$. Thence, after the elapse of the assumed relaxation period (to be described later), the relationship between the value of the optical transmittance and the applied voltage Vz is plotted. When this operation is repeated by changing the value of the voltage |Vz|, the curve drawn from Fs to the point O through At and As of FIG. 1(*a*) and the curve drawn from (−Fs) to the point O through (−At) and (−As) are obtained.

In the case of using some liquid crystal panels, the curve (namely, the curve drawn from Fs or (−Fs) to the point O in FIG. 1(*a*)) obtained in the aforementioned case (2) sometimes intersects the ordinate axis. The main cause of this is the responsivity of the liquid crystal. Namely, in the case that the liquid crystal is maintained in the ferroelectric state by applying thereto a voltage, which is not lower than the aforementioned voltage |FS|, and that at the moment 0, the applied voltage Vz is changed into 0, the liquid crystal finally becomes stable in the antiferroelectric state after the elapse of a certain time period (hereunder referred to as a relaxation time tn). However, if this relaxation time tn is longer than the aforementioned relaxation period, the curve obtained in the aforementioned case (2) intersects the ordinate axis.

When actually driven, it is difficult to bring such a liquid crystal panel into a complete antiferroelectric state. It is, thus, considered that in the case of such a liquid crystal panel, a dark display cannot be effected and that consequently, the contrast is extremely degraded.

Generally, a liquid crystal panel is driven by performing the following process. Namely, first N row electrodes and M column electrodes are formed in such a manner as to be arranged as a matrix of N rows and M columns. Further, a scanning signal is applied to each of the row electrodes through a row-electrode drive circuit, a display signal depending on display data of each pixel (incidentally, a part of the display signal is sometimes not dependent on the display data) is applied to each of the column electrodes through a column-electrode drive circuit. Moreover, a voltage (hereunder referred to simply as a synthetic voltage), which corresponds to the difference between the scanning signal and the display signal, is applied to a liquid crystal layer. The time period required to scan all of the row electrodes (namely, 1 vertical scanning interval) is usually referred to as 1 frame (or 1 field). In the case of driving the liquid crystal panel, the polarity of a driving voltage is reversed each frame (or every frames) in order to prevent the liquid crystal from being adversely affected (for example, the degradation due to the nonuniform distribution of ions).

FIG. 2 illustrates the waveforms of signals flowing through the row electrodes, the column electrodes and the pixel synthesis electrodes of a liquid crystal panel in which the N row electrodes and the M column electrodes are formed in such a manner as to be arranged as a matrix of N rows and M columns. The display states of pixels are assumed as follows. Namely, in the case of a first column (Y1), pixels in all rows are displayed in white. Further, in the case of a second column (Y2), a pixel in a first row is displayed in black, and pixels in the other rows are displayed in white. Moreover, in the case of pixels in a third column (Y3), these pixels are displayed alternately in black and in white. Furthermore, in the case of an Mth column, YM pixels are displayed in black in all rows.

Waveforms of scanning signals are respectively applied to the N row electrodes in sequence from the top row to the bottom row so that each of the waveforms is shifted by a time (1/N). Waveforms of display signals applied to the M column electrodes are synchronized with the scanning signal and the waveforms according to whether the pixels are displayed in white or in black are applied.

Paying attention to a synthetic voltage applied to each pixel, with respect to P11 displayed in white and P12 displayed in black in the first row, the voltage applied to P11 in the selection period tw, which is displayed in white, is a large waveform, whereas the voltage applied to P12 in the selection period tw, which is displayed in black, is a small waveform. The voltage applied to a pixel P21, which is displayed in white in a second row has a waveform which is almost the same as that obtained by shifting the waveform of the synthetic voltage applied to the pixel P11 by (1/N). Here, note that the first and the second frame in the first row and the second row are shifted with respect to each other by (1/N).

Turning attention to a scanning signal applied to a single row electrode, 1 vertical scanning interval thereof is composed of N horizontal scanning intervals (in some cases, an additional period α is added thereto). In a horizontal scanning interval, a part of a horizontal scanning interval in which a special scanning voltage (set at the selection voltage) to be used for determining the display state of a pixel on the aforesaid row is applied, is referred to as a selection period tw. The other part of horizontal scanning interval is referred to as non-selection periods. Moreover, generally, the selection period tw is a time period obtained by dividing 1 frame interval by (N+α).

Usually, in the case of the antiferroelectric liquid crystal panel, it is determined on the basis of the aforementioned display signal at the time of applying the selection voltage whether the state of the liquid crystal, which has been in the antiferroelectric state, is maintained or is changed into the ferroelectric state. Thus, there is the necessity of a time period (hereunder referred to as a relaxation period ts) required for setting the liquid crystals in the antiferroelectric state before the application of the selection voltage. During a time period which is other than the selection period tw and the relaxation period ts, the determined state of the liquid crystal should be held. Hereunder, this time period will be referred to as a holding period tk.

FIG. 3 illustrates the waveforms of a scanning signal waveform Pa applied to a given pixel of interest, display signal waveforms (Pb, Pb'), synthetic signal waveforms (Pc, Pc') and optical transmittances (L100, L0) according to a driving method described in FIGS. 1 and 2 of the Japanese Unexamined Patent Publication (Kokai) No. 4-362990/1992. F1 and F2 designate the first frame F1 and the second frame F2, respectively. Although not shown in this figure, a scanning signal, which has a phase shifted by 1 horizontal scanning interval and has a waveform similar to the scanning signal Pa or has a waveform obtained by inverting the polarity of the scanning signal Pa, is applied to a row electrode adjacent to a row electrode of interest.

FIG. 3 illustrates the case where the polarity of the aforementioned driving voltage is inverted every frame. As is apparent from this figure, the first frame Fl is different from the second frame F2 only in that the polarity of the driving voltage is inverted. As is obvious from the aforementioned FIG. 1(*a*), an operation of the liquid crystal display device is symmetric with respect to the polarity of the driving voltage. Therefore, the following description will be given regarding only the first frame, except in case of necessity. Further, in the following description and drawings of the waveforms of driving signals, the electric potential indicated as “0” does not mean absolute electric potential but means merely a reference electric potential. Therefore, in the case that the reference electric potential varies for some reason, scanning signals and display signals vary relatively. Moreover, in the case that the word “voltage” is used in connection with the scanning signals and the display signals in the following description, the word "voltage" designates the difference between the electric potential indicated by such a signal and the reference electric potential.

As shown in FIG. 3, 1 frame is divided into three time periods, namely, the selection period tw, the holding period tk and the relaxation period ts. The selection period tw is further divided into time periods tw1 and tw2, which have equal lengths. The voltage level of a scanning signal Pa in the first frame F1 is set as follows. Needless to say, in the second frame F2, the polarity of the voltage is inverted. Here, note that ±V1 designates the selection voltage and that the length of the time period tw2 corresponds to the aforementioned Wt.

| Time Period | tw1 | tw2 | tk | ts |
|---|---|---|---|---|
| Scanning Signal Voltage | 0 | +V1 | +V3 | 0 |

Further, the display signal is set as follows. Here, note that the voltages indicated by the symbol "*" depend on the display data of other pixels in a same column.

| Time Period | tw1 | tw2 | tk | ts |
|---|---|---|---|---|
| On-State Display Signal Voltage | +V2 | −V2 | * | * |
| Off-State Display Signal Voltage | −V2 | +V2 | * | * |

In the time period in which the aforementioned selection voltage is applied, each liquid crystal pixel on the selected row is selectively driven on the basis of the display signal. Hereinafter, a time period, in which the scanning signal is the selection voltage, is referred to as a selective driving period (in the case of this conventional example, tw2).

A part, which actually controls a display based on the display data, of the display signal, is a part, which corresponds to the selective driving period, thereof. This part of the display signal is simultaneously applied to liquid crystal pixels arranged on rows which are other than the selected row (and correspond to either the holding period tk or the relaxation period ts in the case of this conventional example) and thus adversely affects the states of the unselected liquid crystal pixels.

For example, in the case that in the hysteresis curves of FIG. 1(*a*), the curve drawn from As to Ft or from At to Fs is not flat, when the voltage applied to the liquid crystal in the holding period tk is shifted depending on the display signals of the other rows, a change in the brightness in this holding period is caused.

Thus, to compensate for the ill effects of this phenomenon, the period tw1 is established in addition to the selective driving period tw2 and moreover, the polarity of the display signal is inverted in the periods tw1 and tw2 so that the average value thereof in a horizontal scanning interval is 0.

Namely, the display signal in the period tw1 plays a role in compensating for the ill effects of the display signal on the pixels, which are arranged on the unselected rows, in the selective driving period. Therefore, hereinafter, a time period, in which the display signal is used for such compensation, is referred to as a compensation signal period.

In FIG. 3, Pb, Pc and L100 respectively denote the waveform of a display signal, that of a synthetic signal and optical transmittance in the case that all of the pixels provided on a column electrode, to which a pixel of interest belongs, are in an on-state (namely, in the bright state). In this case, if the (synthetic) voltage to be applied to the liquid crystal in the selective driving period tw2 meets the following condition: $|V1+V2|>|Fs|$ (see FIG. 1(*a*)), the transition of the state of the liquid crystal into the ferroelectric state is started. As a result, the optical transmittance of the liquid crystal increases. In the holding period tk, if the following condition is satisfied: $|V3-V2|>|At|$, the bright state can be held. In the relaxation period ts, if the following condition is satisfied: $|V2|<|AS|$, the transmittance decreases with the elapse of time. Thus, the relaxation of the liquid crystal, by which the state thereof from the ferroelectric state is changed to the stable antiferroelectric state, is attained.

Further, in FIG. 3, reference characters Pb', Pc' and L0 respectively denote the waveform of a display signal, that of a synthetic signal and optical transmittance in the case that all of the pixels provided on a column electrode, to which a pixel of interest belongs, are in an off-state (namely, in the dark state). In this case, if the synthetic voltage to be applied to the liquid crystal in the selective driving period tw2 meets the following condition: $|V1-V2|<|Ft|$, the voltage applied in the holding period tk meets the following condition: $|V3+V2|<|Ft|$, and the voltage applied in the relaxation period ts meets the following condition: $|V2|<|Ft|$, the dark state is displayed.

FIG. 4 is a waveform diagram illustrating the waveform of a driving signal used in the driving method that is described in the Japanese Unexamined Patent Publication (Kokai) No. 6-214215/1994. In the case of this driving method, 1 frame is divided into the selection period tw and the holding period tk. The aforesaid selection period tw is further divided into three time periods, namely, two time periods tw1 and tw2, which have equal lengths, and a time period tw0 which precedes the two periods tw1 and tw2. In the case of this driving method, the aforementioned relaxation period ts is the aforesaid time period tw0. The length of the time period tw0 is not always equal to that of each of the time periods tw1 and tw2. Further, the voltage level of the scanning signal and the display signals in the first frame F1 are set as follows.

| Time Period | tw0 | tw1 | tw2 | tk |
|---|---|---|---|---|
| Scanning Signal Voltage | 0 | 0 | +V1 | +V3 |
| On-State Display Signal Voltage | 0 | +V2 | −V2 | * |
| Off-State Display Signal Voltage | 0 | −V2 | +V2 | * |

In the case of the driving method described in this Japanese Unexamined Patent Publication (Kokai) No. 6-214215/1994, the zero-volt voltage applying time period (tw0) provided in the leading part of the selection period tw is used as the relaxation period ts. Further, the time period tw1 is the compensation signal period. Moreover, the time period tw2 is the selective driving period.

In the case of the two conventional examples, the selective driving periods, during each of which the selection voltage $|V1|$ is applied so as to determine the bright or dark state of the liquid crystal, are tw2. However, if the length of the aforesaid time period tw2 is insufficient, the transition of the state of the liquid crystal to the ferroelectric state cannot be sufficiently achieved. This impedes the display. Namely, in the case that the transition of the state of the liquid crystal, which has been in the stable antiferroelectric state and presented the dark state, to the almost saturated bright state is performed by applying a constant voltage thereto, a time period (hereunder referred to a ferroelectric saturation time tr) having a certain length is required. Therefore, if the period tw2 becomes shorter than the aforesaid ferroelectric saturation time tr, a change in optical transmittance results in a failure in presenting the bright state sufficiently as indicated by dashed lines in a graph L100 of FIG. 3, so that the contrast is degraded.

In the case of the driving method described in FIGS. 1 and 2 of the Japanese Unexamined Patent Publication (Kokai) No. 4-362990/1992, the length of the aforesaid selective driving period tw2 is a half of the selection period tw. In the case of the driving method described in the Japanese Unexamined Patent Publication (Kokai) No. 6-214215/1994, the length of the aforesaid selective driving period tw2 is less than a half of the selection period tw. Further, generally, the length of the aforesaid selection period tw is given by:

$$tw=F/(N+\alpha)$$

where F denotes the length of 1 frame. Thus, increasing the length of the frame is sufficient to lengthen the period tw2. However, when F is longer than 20 ms (corresponding to 50 Hz), a flicker phenomenon occurs with the result that the display quality is deteriorated. Thus, there is a limit to the length of 1 frame. Under such a limitation, the length of the period tw (thus, the length of the selective driving period tw2) depends on ($N+\alpha$). Therefore, the number N should be small so as to obtain the sufficient length of the period tw2.

The aforementioned ferroelectric saturation time tr changes according to the applied voltage and becomes short when the applied voltage is increased. Hence, when the applied voltage is large, the transition of the state of the liquid crystal to the ferroelectric state can be achieved even if the selective driving period tw2 is short. Usually, the aforementioned column electrode drive circuit and the aforementioned row electrode drive circuit have the maximum ratings, respectively. Consequently, voltages, which exceed the aforesaid ratings, cannot be supplied to the liquid crystals. Furthermore, there are driving restrictions on the selection voltage ($|V1|$) and the display signal voltage ($|V2|$). Thus, there is an upper limit to the voltage which can be applied to the liquid crystals.

Those restrictions result in occurrence of the upper limit to the number of row electrodes on the assumption that the length of the frame is constant. Consequently, it becomes difficult to provide a high resolution display device.

Moreover, the requirement of the large applied voltage results in increase in load imposed on the drive circuit and rise in the power consumption of the display device.

DISCLOSURE OF THE INVENTION

Thus, problems to be solved by the present invention are to provide a higher-contrast antiferroelectric liquid crystal display device by shortening the aforementioned ferroelectric saturation time tr without rising the voltage to be applied in the aforementioned selective driving period tw2 and obtaining a sufficiently bright state, and to provide a higher-resolution antiferroelectric liquid crystal device by shortening the selection period and to provide a lower-power-consumption antiferroelectric liquid crystal device by lowering the driving voltage. The inventors of the present invention have found that in an antiferroelectric liquid crystal display device comprising: a liquid crystal display unit, in which N row electrodes and M column electrodes are formed as a matrix, for effecting a display by using a plurality of pixels arranged in a matrix configuration by means of the aforesaid N row electrodes and the aforesaid M column electrodes; row electrode drive means for applying scanning signals to the aforesaid row electrodes; and column electrode drive means for supplying display signals to the aforesaid column electrodes, wherein scanning signals having selective driving periods, during which selection voltages are applied, are supplied to the aforesaid row electrodes sequentially in a selection period for determining a display state, and wherein synthetic voltages synthesized from the aforesaid scanning signals and the aforesaid display signals are applied to the aforesaid liquid crystal pixels to thereby perform a display operation, in the case where a precedent driving period, which is precedent and adjacent to the aforementioned selective driving period, is established therein and the aforementioned row electrode drive means supplies a scanning signal to each of the row electrodes so that the polarity of the aforementioned synthetic voltage applied to the liquid crystal in the aforesaid precedent driving period is different from the polarity of the aforementioned synthetic voltage applied to the liquid crystal in the aforesaid selective driving period, the aforementioned ferroelectric saturation time tr, namely, the rise time of the optical transmittance at the time of displaying a brightest state varies with the value of the synthetic voltage to be applied to the liquid crystal in the aforementioned precedent driving period even if the synthetic voltage to be applied to the liquid crystals in the aforementioned selective driving period has the same value.

Thus, in accordance with the present invention, there is provided a method of obtaining the value (hereunder referred to as an optimum precedent driving voltage) of a synthetic voltage to be applied to the liquid crystal in a precedent driving period, by which the aforesaid ferroelectric saturation time tr is minimized, in the case that the aforementioned precedent driving period is constant in the aforementioned antiferroelectric liquid crystal display device.

Further, in accordance with the present invention, there is provided an antiferroelectric liquid crystal display device using the aforementioned optimum precedent driving voltage.

Incidentally, the brightest state referred to herein indicates a brightest state used as a display device and does not always indicate the completely saturated bright state. This holds similarly in the following description.

In accordance with the present invention, the voltage, at which the ferroelectric saturation time tr is minimized, namely, the optimum precedent driving voltage is obtained by changing the voltage to be applied in the precedent driving period (namely, the synthetic voltage) while maintaining the voltage to be applied in the selective driving period (namely, the synthetic voltage) at a constant value.

Further, the inventors of the present invention have found that the aforementioned optimum precedent driving voltage becomes low if the precedent driving period becomes long and that in contrast, the aforementioned optimum precedent driving voltage becomes high if the precedent driving period becomes short.

Thus, the present invention aims at providing the antiferroelectric liquid crystal display device which can regulate the optimum precedent driving voltage by adjusting the length of the precedent driving period.

Further, the present invention aims at providing an antiferroelectric liquid crystal display device which can obtain a curve representing the relation between the optical transmittance and the applied voltage according to a novel method (hereunder referred to as a time fixation method 3), by which the optimum precedent driving voltage is specifically determined, and can regulate the optimum precedent driving voltage by using the relation between the optimum precedent driving voltage and the precedent driving period on the basis of the obtained curve representing the relation between the optical transmittance and the applied voltage.

Moreover, the present invention aims at providing an antiferroelectric liquid crystal display device which is adapted to change at least the value of the scanning signal voltage in the precedent driving period according to a change in temperature and can be driven under optimum conditions even when the temperature changes.

ADVANTAGES OF THE INVENTION

As above described, in accordance with the present invention, a time required for the transition of the state from the dark state to the bright state can be reduced. Thus, a favorable bright display can be obtained in the selection period tw. Thereby, a high-contrast antiferroelectric liquid crystal display device can be provided. Moreover, the length of the selection period tw can be decreased, and a higher resolution antiferroelectric liquid crystal device can be provided. Furthermore, the synthetic voltage at the time of applying the selection voltage can be made small. Thus, the withstand voltages of the row electrode drive circuit and the column electrode drive circuit can be set at low values, respectively. Thereby, a low-power-consumption low-cost antiferroelectric liquid crystal display device can be provided. Furthermore, the values of the optimum precedent driving voltage can be regulated, so that an antiferroelectric liquid crystal display device, which meets various requirements, can be provided by maintaining the advantages described hereinabove.

DETAILED DESCRIPTION OF THE INVENTION

Figure 3:
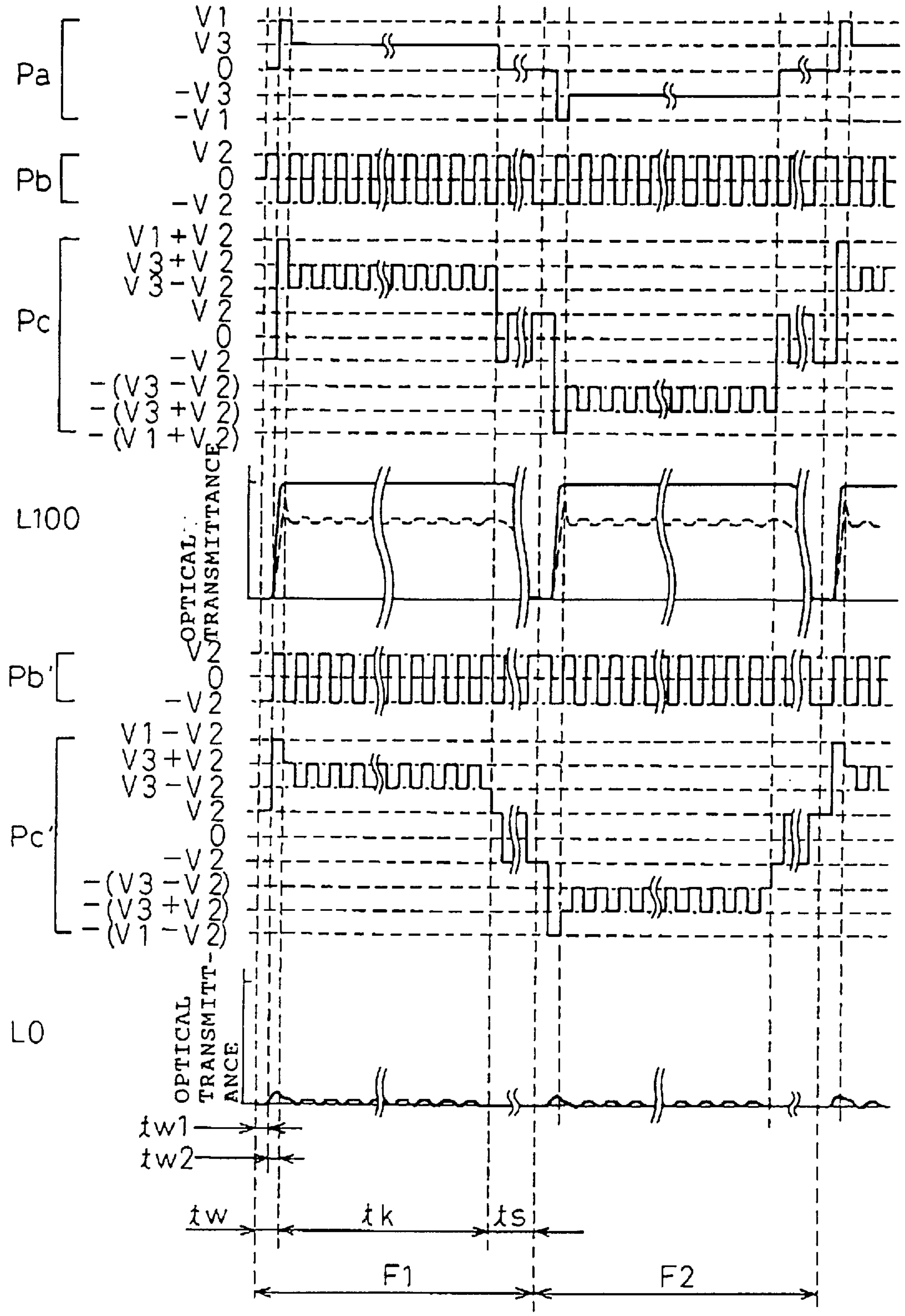
FIG. 3 is a diagram illustrating the driving waveforms and the optical transmittance for showing the conventional driving method.

The inventors of the present invention have investigated the aforementioned ferroelectric saturation time tr by changing each driving voltage in the driving method illustrated in FIG. 3. In this case, the synthetic voltage applied to liquid crystals in the period tw2 (namely, the selective driving period) is |V1|+|V2|. Therefore, the synthetic voltage can be changed by varying either of |V1| and |V2|. This investigation has revealed that even if the synthetic voltage has a same value, the aforementioned ferroelectric saturation time tr sometimes has a different length. Namely, even if the value of (|V1|+|V2|) is made to be constant, the ferroelectric saturation time tr varies with the value of |V2|, namely, varies with the value of the voltage applied to the liquid crystals in the period tw1. The inventors of the present invention have presumed that this phenomenon is caused owing to the influence of the state of the liquid crystal in the period tw1. Further, the inventors have invented a method of obtaining the voltage applied to the liquid crystal in the period tw1, by which the ferroelectric saturation time tr is minimized.

Hereinafter, the method of the present invention is described.

Figure 5:
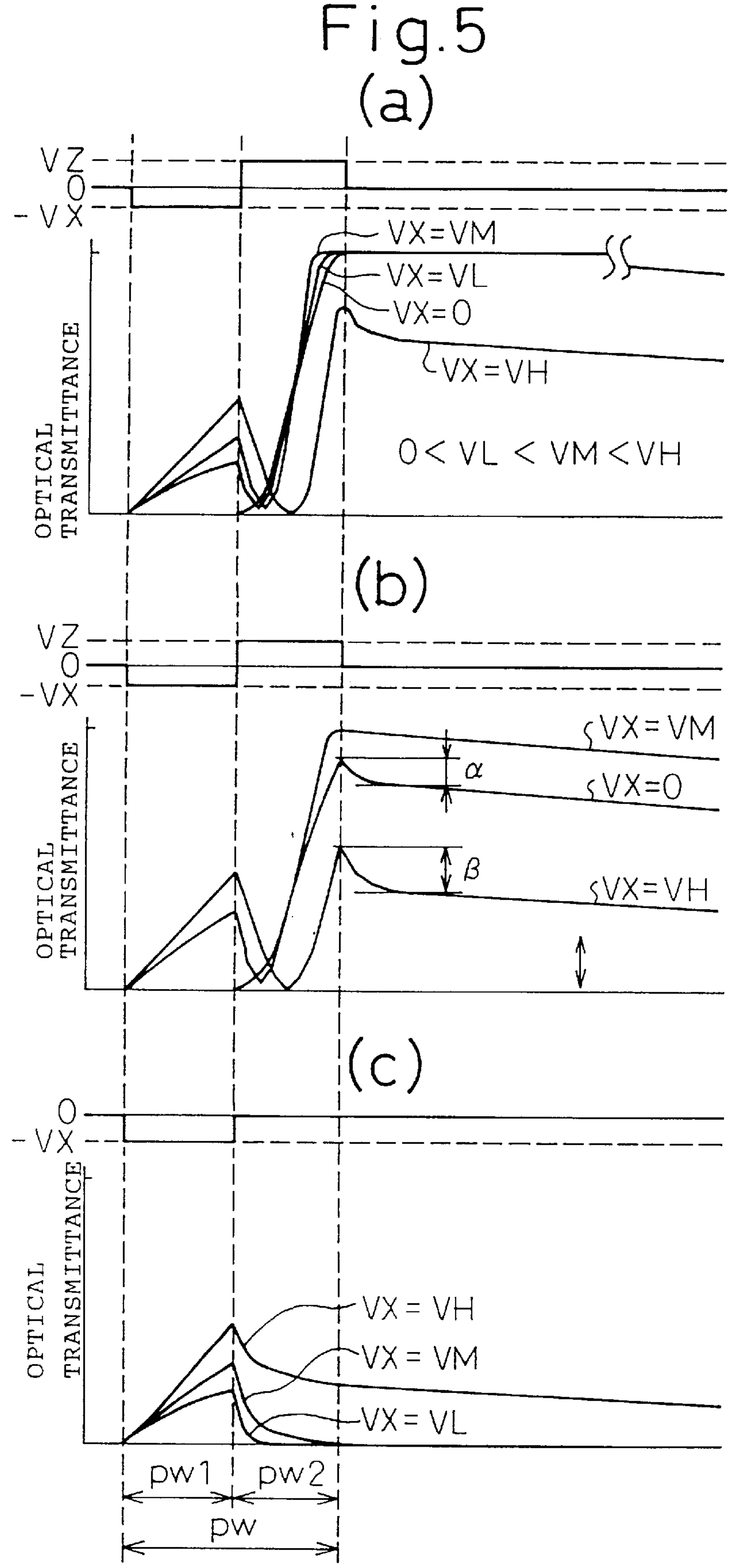
FIGS. 5(*a*), 5(*b*) and 5(*c*) are diagrams showing changes in the optical transmittance when changing the applied voltage, for illustrating the present invention.

FIG. 5(*a*) is a diagram illustrating the waveform of the applied voltage used in the investigation and changes in the optical transmittance. As shown in FIG. 5(*a*), in a period pw1 (corresponding to the precedent driving period), which is precedent and adjacent to the selective driving period, a voltage (−Vx) is applied to the liquid crystals. In the period pw2 corresponding to the selection driving period, a constant voltage Vz is applied thereto. In other periods, voltage 0 is applied thereto. In this case, the aforesaid voltage Vz is set at a value at which the liquid crystals are brought in a fully saturated ferroelectric state in the period pw2. Further, during maintaining Vz at a constant value, the value of Vx is changed into 0, VL, VM and VH ($0<VL<VM<VH$), respectively, and then changes in the optical transmittance, which respectively corresponds to these values of Vx, are obtained.

According to a result of this investigation, even when the voltage Vz to be applied in the period pw2 is constant, the aforementioned ferroelectric saturation time tr varies with the value of the voltage Vx to be applied in the period pw1. Moreover, it is found that there is an optimum value VM (namely, the optimum precedent driving voltage), at which the aforesaid ferroelectric saturation time tr has a minimal length, of the voltage Vx. The above is the method of obtaining the optimum precedent driving voltage VM according to the present invention. Therefore, if VM obtained by the aforementioned method is used as a precedent driving voltage, the ferroelectric saturation time tr can be minimized.

Incidentally, as shown in FIG. 5(*a*), in the case that Vx is 0, VL or VM, there is a short time period, in which the saturated optical transmittance is maintained even if the applied voltage is changed into 0, after the expiration of the period pw2. However, the optical transmittance decreases after the lapse of a certain time.

The inventors have performed a similar investigation by changing the period pw1 in various manners. Further, it has been found that the aforementioned optimum precedent driving voltage VM varies with the length of the period pw1, that if the period pw1 becomes longer, the value of the voltage VM decreases, while if the period pw1 becomes shorter, the value of the voltage VM increases, and that the voltage VM is such that in any case, the optical transmittance at the time of expiration of the aforesaid period pw1 has an almost constant value.

Hereinafter, it will be considered why the optimum value of Vx, that is VM (namely, the optimum precedent driving voltage), at which the ferroelectric saturation time tr has a minimal length, exists in the case that the voltage Vz to be applied in the selective driving period pw2 is made to have a constant value and the value of the voltage Vx to be applied in the precedent driving period pw1 is changed.

FIG. 5(*b*) is another diagram illustrating the waveform of the applied voltage and changes in the optical transmittance. This figure shows changes in the optical transmittance in the case where the voltage Vz is first regulated so that the optical transmittance reaches a maximum value when Vx=VM, and moreover, the aforesaid voltage Vz is made to have a constant value and the value of the aforementioned voltage Vx is changed. It is seen from FIG. 5(*b*) that unless the value of Vz is further increased in the case when the value of Vx is other than VM, the liquid crystal cannot be brought into a saturated ferroelectric state in the period pw2. Namely, when Vx=VM, the liquid crystal can be brought into a saturated ferroelectric state at the lowest applied voltage. Further, the value of Vz required to bring the liquid crystals into the saturated ferroelectric state in the period pw2 is steeply increased if Vx is made to become larger than VM.

The phenomenon described hereinabove is considered to be as follows. Namely, when the constant voltage Vz, by which the liquid crystals are caused to fall into the (+) ferroelectric state, is applied to the liquid crystals in the period pw2, a force received by the liquid crystal molecules in a case, in which the liquid crystals are in the (−) ferroelectric state, is rather larger than a force received by such molecules in a case, in which the liquid crystal is in the neutral state. Thus, when $Vx>0$, the liquid crystal molecules receive a larger force and the speed of transition of the state of the liquid crystals rises to a higher value, in comparison with the case that Vx=0. However, when Vx exceeds a certain extent, a time required to restore the liquid crystal molecules, which have been in the (−) ferroelectric state, to the antiferroelectric state is steeply increased. As a consequence, the time required to bring the liquid crystal molecules into the saturated (+) ferroelectric state is also steeply increased.

FIG. 5(*c*) is still another diagram illustrating the waveform of the applied voltage and changes in the optical transmittance. As shown in FIG. 5(*c*), in a period pw1, a voltage (−Vx) is applied to the liquid crystals. In the period pw2 and other periods, 0 is applied thereto. If the value of Vx is changed into VL, VM and VH ($0<VL<VM<VH$), respectively, during maintaining Vz at 0, the values of the optical transmittance, which respectively correspond to these values of Vx, are obtained.

As is understood from the comparison between FIGS. 5(*a*) and 5(*c*), the aforementioned ferroelectric saturation time tr is relatively short if $Vx<VM$, in the case illustrated in FIG. 5(*a*). However, the time tr is steeply increased if $Vx>VM$ in such a case. In the case illustrated in FIG. 5(*c*), the time required to perform relaxation of the liquid crystals after the expiration of the period pw1 is relatively short if $Vx<VM$, but is steeply increased if $Vx>VM$.

In the case illustrated in FIG. 5(*c*), close studies of changes in the optical transmittance occurring after the expiration of the period pw1 show that at least two responses coexist in a response, by which the optical transmittance is decreased to 0 after the applied voltage becomes 0. Namely, one is a response by which the optical transmittance is quickly reduced to 0 according to the change in the voltage. The other is a response by which the optical transmittance is relatively slowly reduced to 0. Further, an amount of a change in the optical transmittance, which is considered as being due to the fast response immediately after the expiration of the period pw1, has a largest value in the case that Vx VM. However, in both cases that $Vx<VM$ and that $Vx>VM$, the amount of a change in the optical transmittance decreases.

By another investigation, the inventors of the present invention have verified that even when the optical transmittance is increased, a rapid response (hereunder referred to as a fast response) and a tardy response (hereunder referred to as a slow response) coexist, in addition to the case when the optical transmittance decreases.

It is considered that the aforementioned fast and slow responses have a bearing on the respect that the time required to restore the liquid crystal molecules, which have been in the (−) ferroelectric state, to the antiferroelectric state considerably varies in the case where Vx is in the vicinity of VM.

The relation between the fast and slow responses has not been clearly explained yet. However, it seems to be disproved that a portion, which relatively easily causes phase change, and a portion, which does not easily cause phase change, coexist in the liquid crystal and that the fast response represents a change in the state of the portion which relatively easily causes phase change.

Namely, as the optical transmittance becomes higher, there should be an increased possibility that the portion, which relatively easily causes phase transition, is in the ferroelectric state. If so, the amount of a change in the optical transmittance, which is considered as being owing to the fast response, should be increased when the applied voltage is made to be 0. However, regarding the actual amount of a change in the optical transmittance, which is considered as being due to the fast response after the expiration of the period pw2, the actual amount ($\beta$) in the case, in which the initial optical transmittance is low, is larger than the actual amount ($\alpha$) in the case where the initial optical transmittance is high, as illustrated in, for example, FIG. 5(*b*). Further, regarding the actual amount of a change in the optical transmittance, which is considered as being due to the fast response after the expiration of the period pw1, the actual amount in the case Vx=VM, namely, the initial optical transmittance is low, is larger than the actual amount in the case Vx=VH, namely, the initial optical transmittance is high, as illustrated in, for instance, FIG. 5(*c*).

Thus, a hypothesis, as follows is produced.

(A) The antiferroelectric liquid crystal panel used as a sample has still another state (hereunder referred to simply as a non-stable state), in which non-zero optical transmittance is exhibited, in addition to the ferroelectric state and the antiferroelectric state. Incidentally, it is not clear whether the entire panel or a part of the panel has such a non-stable state.

(B) The change between the aforesaid non-stable state and the antiferroelectric state is relatively easily performed.

(C) The change between the aforesaid non-stable state and the ferroelectric state is not relatively easily performed.

(D) The change between the antiferroelectric state and the ferroelectric state is not easily performed.

Based on the hypothesis described hereinabove, the aforementioned two responses is described hereinbelow. When the voltage Vx=VL is applied in the period pw1 in FIG. 5(*c*), a part, whose state is changed from the antiferroelectric state to the non-stable state, of the liquid crystals increase with time. Thus, the optical transmittance rises. However, at the time of expiration of the period pw1, all of parts, which can be in the non-stable state, of the liquid crystals are not in the non-stable state. When the period pw1 expires, the parts, which have been in the non-stable state, of the liquid crystals change the states thereof to the antiferroelectric state easily and rapidly.

When the voltage Vx=VM is applied in the period pw1 in FIG. 5(*c*), a part, whose state is changed from the antiferroelectric state to the non-stable state, of the liquid crystals increase with time. Thus, the optical transmittance rises. However, at the time of expiration of the period pw1, all of parts, which can be in the non-stable state, of the liquid crystals are in the non-stable state. When the period pw1 expires, the parts, which have been in the non-stable state, of the liquid crystals change the states thereof to the antiferroelectric state easily and rapidly. The amount of this change in the optical transmittance by the fast response is larger than that in the case of applying the voltage Vx=VL.

When the voltage Vx=VH is applied in the period pw1 in FIG. 5(*c*), a part, whose state is changed from the antiferroelectric state to the non-stable state, of the liquid crystals increase with time. Thus, the optical transmittance rises. However, at the time of expiration of the period pw1, all of parts, which can be in the non-stable state, of the liquid crystals are in the non-stable state in the middle of the period pw1. These parts of the liquid crystals further change the state thereof to the ferroelectric state with lapse of time. When the period pw1 expires, only the parts which do not change the state thereof to the ferroelectric state but have been still in the non-stable state, of the liquid crystals change the states thereof to the antiferroelectric state easily and rapidly. The parts, which have changed the state thereof to the ferroelectric state, are slowly relaxed and changed into the antiferroelectric state by the slow response. In this case, the amount of this change in the optical transmittance by the fast response is smaller than that in the case of applying the voltage Vx=VM.

Namely, as shown in FIG. 5(*a*), in the case that Vx<VM, the value of the optical transmittance at the time of expiration of the period pw1 is obtained owing to the parts, which are in the non-stable state, of the liquid crystals. There are almost no parts of the liquid crystals, which are in the ferroelectric state. Consequently, all of the relaxation is caused by the fast response.

In contrast, in the case that Vx>VM, the parts, which are in the aforementioned non-stable state, of the liquid crystals at the time of expiration of the period pw1 rather decrease. Conversely, the parts, which are in the ferroelectric state, of the liquid crystals increase. Although the parts, which have been in the non-stable state, extremely easily respond to the application of Vz in the period pw2, it is not easy to perform the relaxation of the parts, which have been in the ferroelectric state, to the antiferroelectric state. Because this is owing to the slow response, the required time becomes longer by that amount. Therefore, if Vx>VM, the aforementioned ferroelectric saturation time tr is quickly increased.

Namely, the case of minimizing the ferroelectric saturation time tr is that of setting the value of Vx at a large value to the extent that the liquid crystals cause almost no slow response, namely, to the extent that the liquid crystals cause almost no transition to the ferroelectric states, and further in other words, that the state of the crystal is merely changed into the aforementioned non-stable state.

Thus, the inventors of the present invention obtained an antiferroelectric liquid crystal display device comprising: a liquid crystal display unit, in which N row electrodes and M column electrodes are formed as a matrix, for effecting a display by using a plurality of pixels arranged in a matrix configuration by means of the aforesaid N row electrodes and the aforesaid M column electrodes; row electrode drive means for applying scanning signals to the aforesaid row electrodes; and column electrode drive means for supplying display signals to the aforesaid column electrodes, wherein scanning signals having selective driving periods, during which selection voltages are applied, are supplied to the aforesaid row electrodes sequentially in a selection period for determining a display state, and wherein synthetic voltages synthesized from the aforesaid scanning signals and the aforesaid display signals are applied to the aforesaid liquid crystal pixels to thereby perform a display operation, in the case where a precedent driving period, which is precedent and adjacent to the aforementioned selective driving period, is established therein and the aforementioned row electrode drive means supplies a scanning signal to each of the row electrodes so that the polarity of the aforementioned synthetic voltage applied to the liquid crystal in the aforesaid precedent driving period is different from the polarity of the aforementioned synthetic voltage applied to the liquid crystal in the aforesaid selective driving period, and so that a synthetic voltage applied to said liquid crystals in the precedent driving period has a value at which most of said liquid crystals are brought into a state which is immediately before the transition to a ferroelectric state, and wherein a ferroelectric saturation time tr is minimized.

Next, the inventors of the present invention have previously stated that the inventors have found the following facts that the aforementioned optimum precedent driving voltage VM varies with the length of the period pw1, that if the period pw1 becomes longer, the value of the voltage VM decreases, while if the period pw1 becomes shorter, the value of the voltage VM increases, and that the voltage VM is such that in any case, the optical transmittance at the time of expiration of the aforesaid period pw1 has an almost constant value.

Thus, the antiferroelectric liquid crystal display device according the present invention, which can adjust the optimum precedent driving voltage by regulating the precedent driving period, is described hereinbelow.

To obtain the antiferroelectric liquid crystal display device, in accordance with the present invention, a curve (namely, the hysteresis curve) representing the relationship between the optical transmittance and the applied voltage is obtained according to a novel method (namely, the time fixation method 3), by which the optimum precedent driving voltage is specifically determined, and the optimum precedent driving voltage can be regulated by using the relationship between the optimum precedent driving voltage and the precedent driving period on the basis of the obtained curve.

Figure 1:
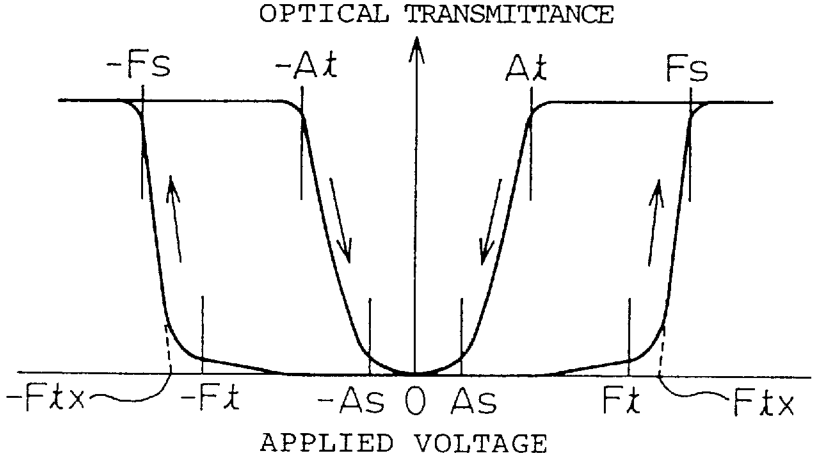
FIGS. 1(*a*) and 1(*b*) are diagrams illustrating changes in the optical transmittance of an antiferroelectric liquid crystal panel versus the voltage applied thereto.
Figure 1:
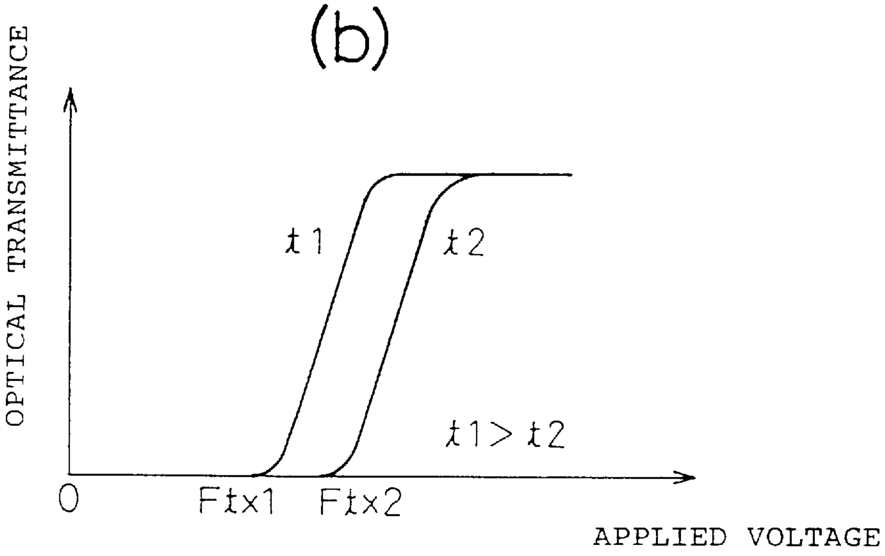
Figure 2:
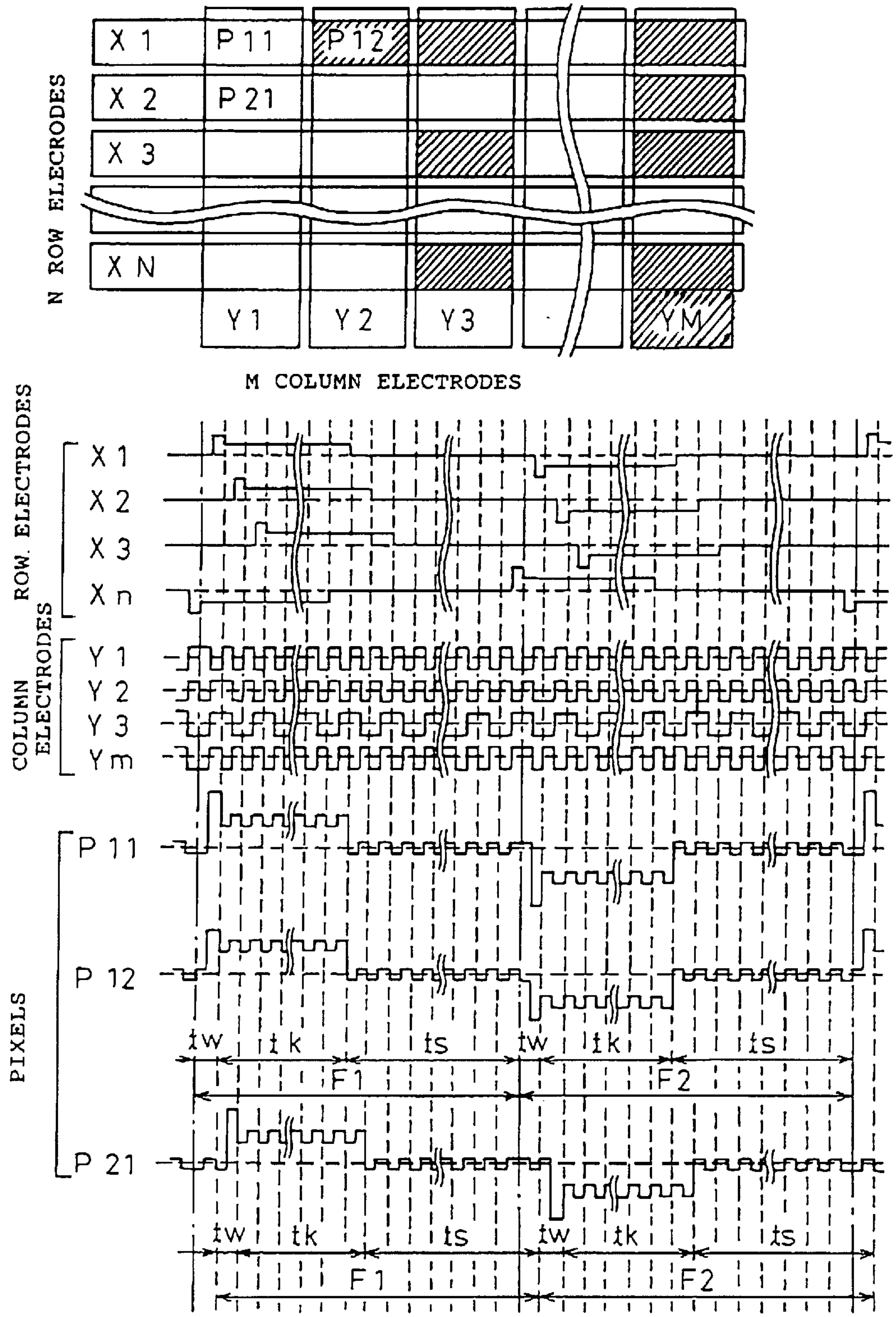
FIG. 2 is a diagram illustrating the waveforms of the signals flowing through the row electrodes, the column electrodes and the pixel synthesis electrodes of the liquid crystal panel in which the N row electrodes and the M column electrodes are formed in such a manner as to be arranged as a matrix.

In the case of the aforementioned time fixation method 1 used to obtain the hysteresis characteristics of FIG. 1(*a*), the method of "applying a pulse voltage, whose duration is Wt and voltage level is Vx, is applied to the liquid crystal that is in a stable antiferroelectric state (namely, in the neutral state) and further plotting the relation in value between the optical transmittance and the pulse voltage Vx at the time of completion of the application of this pulse voltage" is used so as to obtain the curve O-Ft-Fs. However, according to a result obtained by plotting the optical transmittance at the time of expiration of the period pw1, which is the time of expiration of the application of the pulse voltage, in FIG. 5(*c*) by this method, the measured optical transmittance in the case of this method includes a portion of the optical transmittance, which is presented by the liquid crystal having been in the aforementioned non-stable state. Further, this portion decreases just at a moment when the applied voltage drops, so that the expected brightness is not obtained in the actual driving operation. Thus, a new curve representing the relationship between the optical transmittance and the applied voltage (namely, a hysteresis curve) is obtained by adding the optical transmittance at the time of termination of this fast response (namely, the time of expiration of the period pw2 shown in FIG. 5(*c*)) instead of the time of expiration of the period pw1. Namely, as illustrated in FIG. 5(*c*), a voltage pulse representing the voltage (−Vx) is applied in the period pw1. Further, 0 is applied in the period pw2 and in other periods. The optical transmittance at the time of expiration of the period pw2 is plotted by changing the value of the voltage Vx. Then, this curve indicates an extremely definite threshold Ftx as represented by dashed lines in FIG. 1(*a*). Hereunder, this threshold value |Ftx| is referred to as a ferroelectric intrinsic threshold. This ferroelectric intrinsic threshold is a threshold at which the transition of the state is commenced. It is considered that a part, in which the optical transmittance rises gradually, in the conventional case is due to the transition to the non-stable state, which corresponds to the fast response.

The inventors of the present invention have verified that the optical transmittance at the time of expiration of the period pw2 in the case in which Vx=VM as shown in FIG. 5(*c*), is nearly equal to or is a little larger than the optical transmittance at the aforementioned ferroelectric intrinsic threshold of FIG. 1(*a*). Namely, it has been found that VM is approximately equal to Ftx.

However, this does not necessarily mean that the synthetic voltage is set at |Ftx| in the precedent driving period according to the present invention. This is because the value of the synthetic voltage to be applied changes when changing the length of the precedent driving period, as previously described. For example, when the length of the precedent driving period varies from t1 to t2 as illustrated in FIG. 1(*b*), the value of |Ftx| also varies from |Ftx1| to a different value |Ftx2|.

However, the value of the synthetic voltage to be applied to the liquid crystals in the precedent driving period can be regulated by utilizing this relation. For instance, when wishing to set the synthetic voltage at a specific value in connection with a power supply, the synthetic voltage to be applied to the liquid crystals in the precedent driving period can be set at a desired value by regulating the length of the precedent driving period. Conversely, when wishing to regulate the length of the precedent driving period, for example, when shortening the precedent driving period, the setting of the synthetic voltage at a high value suffices.

Hereinafter, the antiferroelectric liquid crystal display device embodying the present invention, which uses the optimum precedent driving voltage obtained by the method of the present invention, will be described by referring to the accompanying drawings. The following description will be given regarding only the first frame, unless descriptions concerning the second frame are necessary. Further, the description concerning the second frame, which is different only in polarity of the applied voltage from the first frame, is omitted herein.

The present invention can have similar advantages in both of the cases that a multi-level gray shades display according to the amplitude modulation system (namely, the peak-value gray scale) or the pulse width modulation system (namely, the pulse width gray scale) is effected and that the electrodes are driven by using similar driving waveforms other than those indicated in the embodiments.

Incidentally, in the following description, |V2| will indicate a display signal voltage, by which the aforementioned brightest state is given. Therefore, in the case of effecting the peak-value gray scale display, display signals, whose amplitudes are not more than that of |V2|, coexist as display signals. Further, in the case of effecting the pulse width gray scale display, the levels of display signals used in the selective driving period includes +V2 and (−V2).

Figure 6:
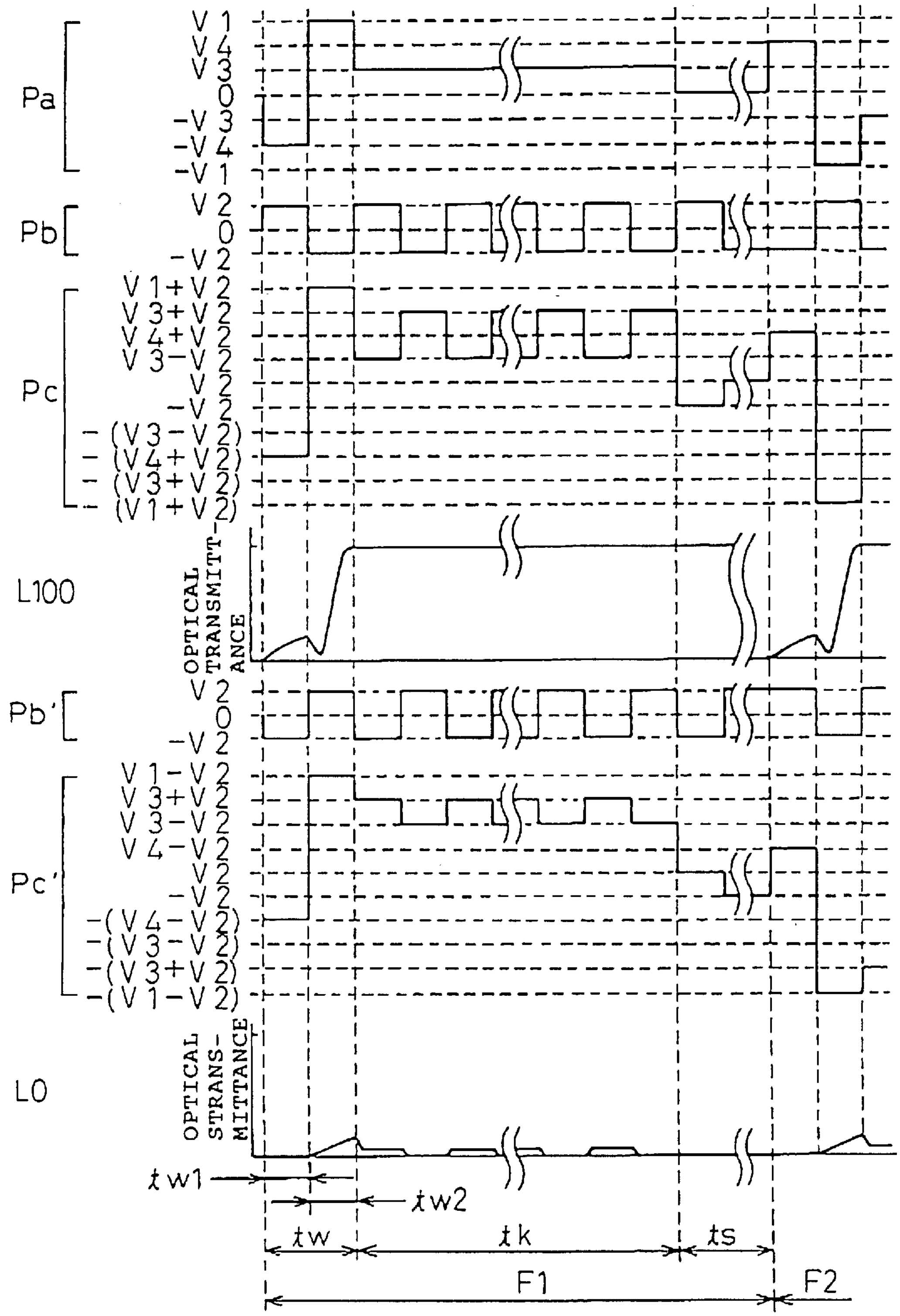
FIG. 6 is a diagram illustrating the driving waveforms and the optical transmittance for showing a liquid crystal display device, which is a first embodiment of the present invention.

FIG. 6 illustrates the first embodiment and is a diagram showing the driving waveforms concerning a pixel of interest and a change in the optical transmittance. In the case of this embodiment, let tw1 and tw2 denote a first half and a second half of the selection period tw, respectively. The voltage levels, which are represented by the scanning signal and the display signals in the time periods tw1, tw2, the holding period tk and the relaxation period ts in the first frame F1, are as listed hereinbelow.

| Time Period | tw1 | tw2 | tk | ts |
|---|---|---|---|---|
| Scanning Signal Voltage | −V4 | +V1 | +V3 | 0 |
| On-State Display Signal Voltage | +V2 | −V2 | * | * |
| Off-State Display Signal Voltage | −V2 | +V2 | * | * |

In this case, the value of |V4| is set in such a manner that the value of |V4+V2| is equal to that of |VM| obtained in the case where the following equations are satisfied: Vz=V1+V2, pw1=tw1 and pw2=tw2 in FIG. 5(*a*).

In the aforementioned embodiment, V1=22 V, V2=5 V, V3=7.2 V, and V4=13 V.

In the case of this embodiment, tw1 denotes the compensation signal period. Therefore, the precedent driving period, which precedes the selective drive period tw2, is the entirety of the compensation signal period tw1.

In the case that all of the pixels provided on a column electrode, to which a pixel of interest belongs, are in the bright state, the change in the optical transmittance (L100) will be described hereinbelow. In the first frame of FIG. 6, the voltage −(V4+V2) applied in the compensation signal period tw1 of the selection period tw causes the liquid crystals to start changing the state thereof to the (−) non-stable state by the fast response. The optical transmittance gradually increases. At the time of expiration of the aforesaid compensation signal period, most of the liquid crystals are in a state immediately before the transition thereof to the (−) ferroelectric state is completed. When the voltage (V1+V2) is applied in the selective driving period tw2, the liquid crystals, which have been in the (−) non-stable state, receive a force, whose strength is larger than that of the conventional case, and thus the transition thereof to the (+) ferroelectric state is abruptly progressed. Then, the liquid crystals are brought into the bright state through the neutral state. In the holding period tk, the voltages (V3−V2) and (V3+V2) are alternately applied thereto. However, during the aforesaid holding period tk, the liquid crystals are held in the bright state. Subsequently, when the voltages V2 and (−V2) are applied thereto in the relaxation period ts, the liquid crystals change the state thereof to the antiferroelectric state from the ferroelectric state and then the liquid crystals become stable in the antiferroelectric state.

The case, in which the dark state of the pixel is indicated (see L0), will be described hereunder. It is assumed that pixels other than the pixel to be displayed are in the dark state. The voltage −(V4−V2) applied in the compensation signal period tw1 in the selection period tw in the first frame of FIG. 5 is sufficiently small, no change in the optical transmittance by the fast response is caused.

If the absolute value of the voltage applied in the selective driving period tw2, the holding period tk and the relaxation period ts is smaller than the ferroelectric threshold voltage |Ft|, the antiferroelectric state of the liquid crystals is maintained as the state thereof. The optical transmittance is maintained at a low value. Thus, the pixels indicate the dark state.

As is apparent from FIG. 5(*a*), even if the voltage applied in the compensation signal period tw1 is lower than VM, it can expedite the lapse of the ferroelectric saturation time tr. Thus, the synthetic voltage (V4+V2) applied in the compensation signal period tw1 may be set at a value which is a little lower than VM, in consideration of a safety allowance. Moreover, although V3<V4<V1 in the first embodiment, the relation among these voltages may be different from such an inequality according to the selection period tw and the characteristics of the antiferroelectric liquid crystal panel.

In the case that the gray shades display is performed in the embodiment of FIG. 6, the amplitude of the synthetic voltage (in the case of the amplitude modulation system) or the pulse width thereof (in the case of the pulse width modulation system) in the precedent driving period is changed according to the display signal. This is different from the case of displaying the maximum bright state. Advantages obtained in this case correspond to those obtained in the case where the voltage Vx is set so that the following inequality is satisfied in the precedent driving period in FIG. 5(*a*): Vx<VM. This results only in occurrence of a little change in the gray scale-voltage curve. Therefore, no problems are caused in an operation of the device if a control operation is performed by allowing for such a change. Incidentally, in the case of effecting a gray scale display, the maximum bright state of the present invention is nothing but the brightest gray scale.

Figure 7:
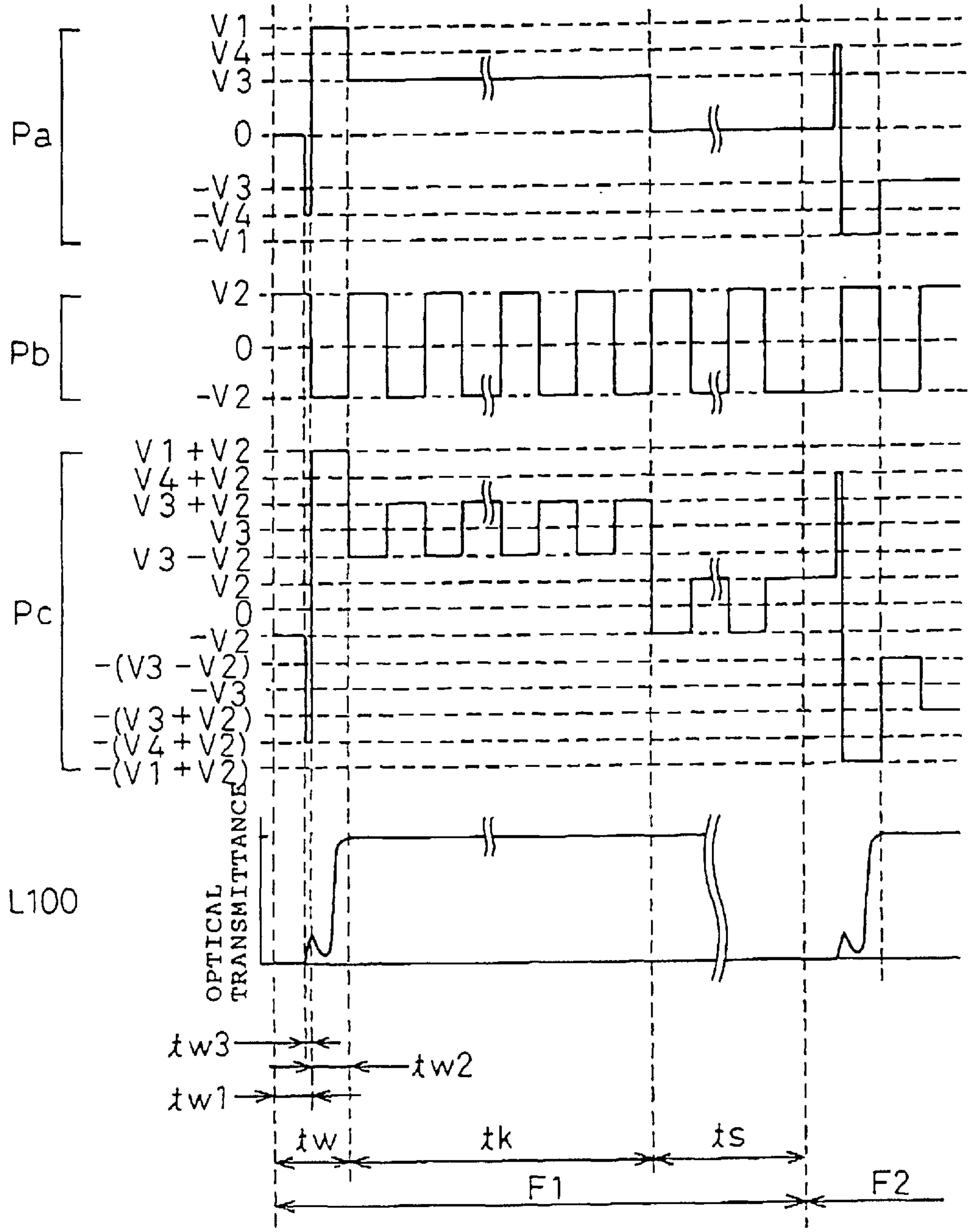
FIG. 7 is a diagram illustrating the driving waveforms and the optical transmittance for showing a liquid crystal display device, which is a second embodiment of the present invention.

FIG. 7 illustrates the second embodiment and is a diagram illustrating the driving waveform concerning a pixel of interest and further illustrating a change in the optical transmittance. In the case of this embodiment, the selection period tw is divided into the compensation signal period tw1 and the selective driving period tw2, which have equal lengths. Further, the precedent driving period tw3 is established in a part of the compensation signal period tw1 in such a manner as to be precedent to the selective driving period tw2. Namely, differently from the embodiment of FIG. 6, in which the precedent driving period is the entirety of the compensation signal period tw1, a part of the compensation signal period tw1 is utilized as the precedent driving period in the case of the second embodiment.

The voltage levels, which are represented by the scanning signal and the display signals in the time periods (tw1−tw3), tw3, tw2, the holding period tk and the relaxation period ts in the first frame F1, are as listed hereinbelow.

| Time Period | tw1−tw3 | tw3 | tw2 | tk | ts |
|---|---|---|---|---|---|
| Scanning Signal Voltage | 0 | −V4 | +V1 | +V3 | 0 |
| On-State Display Signal Voltage | +V2 | +V2 | −V2 | * | * |
| Off-State Display Signal Voltage | −V2 | −V2 | +V2 | * | * |

In this case, the value of |V4| is set so that the rise time of the optical transmittance in the aforesaid period tw2 is minimized in the case when the display signal voltage is +V2 in the compensation signal period tw1, and is −V2 in the selective driving period tw2. Naturally, the value of |VM| is increased from the value thereof in the case of FIG. 6 by an amount corresponding to a decrement by which the length of precedent driving period is reduced. In the case of this second embodiment, it is even more convenient if the number of required power supplies can be decreased by regulating the length of the precedent driving period tw3, setting |V4|=|V1|, and thus setting |VM|=|V1|.

Figure 8:
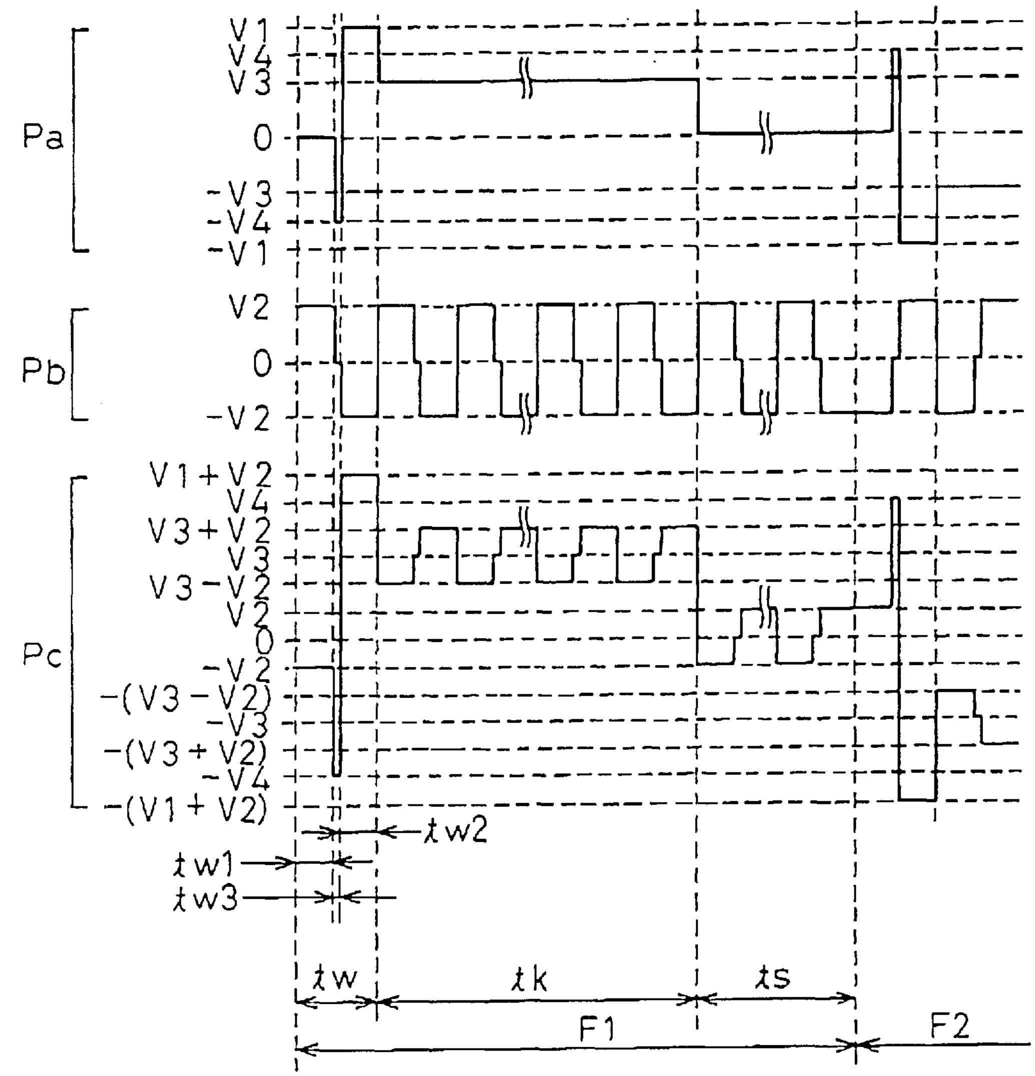
FIG. 8 is a diagram illustrating the driving waveforms for showing a liquid crystal display device, which is a third embodiment of the present invention.

FIG. 8 illustrates the third embodiment and is a diagram illustrating the driving waveform concerning a pixel of interest. In the case of this embodiment, the selection period tw is divided into the compensation signal period tw1 and the selective driving period tw2, which have equal lengths. Further, the precedent driving period tw3 is established in such a manner as to precede the selective driving period tw2 and is posterior to the compensation signal period tw1. Namely, differently from the embodiments of FIGS. 6 and 7, in which the precedent driving period is provided within the compensation signal period tw1, the precedent driving period is provided outside the compensation signal period tw1 in the case of the third embodiment.

The voltage levels, which are represented by the scanning signal and the display signals in the time periods tw1, tw3, tw2, the holding period tk and the relaxation period ts in the first frame F1, are as listed hereinbelow.

| Time Period | tw1 | tw3 | tw2 | tk | ts |
|---|---|---|---|---|---|
| Scanning Signal Voltage | 0 | −V4 | +V1 | +V3 | 0 |
| On-State Display Signal Voltage | +V2 | 0 | −V2 | * | * |
| Off-State Display Signal Voltage | −V2 | 0 | +V2 | * | * |

In this case, the value of |V4| is set so that the rise time of the optical transmittance in the aforesaid period tw2 is minimized in the case when the display signal voltage is +V2 in the compensation signal period tw1, and is −V2 in the selective driving period tw2. Naturally, the value of |VM| may be increased or decreased from the value thereof in the case of FIG. 6, depending on the length of the precedent driving period tw3. However, when the length of the precedent driving period tw3 is increased, the compensation signal period tw1 and the selective driving period tw2 are reduced by an increased amount of tw3. Therefore, it is desirable that |V4| is set at a large value and that the length of the precedent driving period tw3 is decreased to the least possible length. In the case of this third embodiment, it is even more convenient if the number of required power supplies can be decreased by regulating the length of the precedent driving period tw3, setting |V4|=|V1|, and thus setting |VM|=|V1|.

In the case of the embodiment of FIG. 8, the voltage applied to the liquid crystals in the precedent driving period tw3 can be made to be constant at all times independent of the display signals. Thus, the linearity can be easily obtained in the case of effecting the gray scale display.

Figure 4:
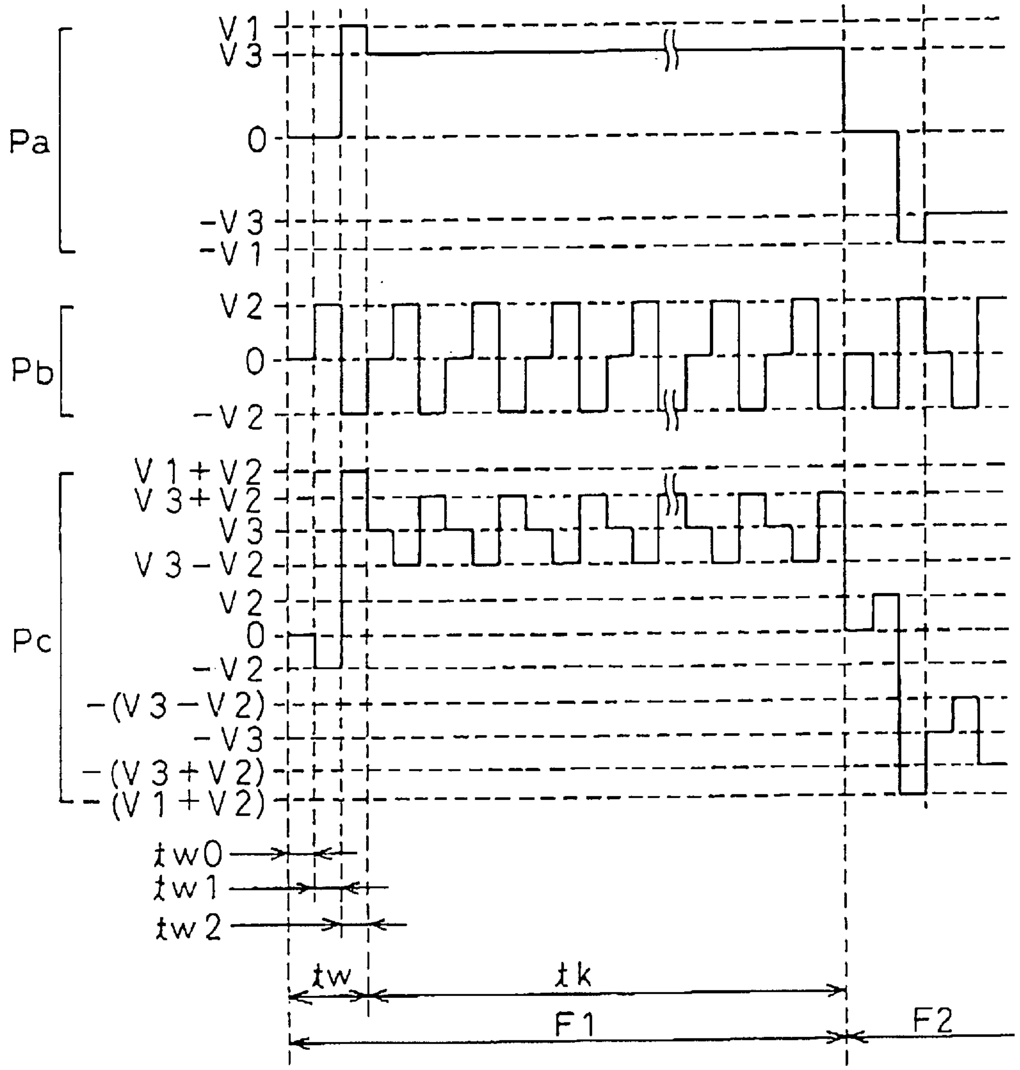
FIG. 4 is a diagram illustrating the driving waveforms obtained according to the conventional driving method.
Figure 9:
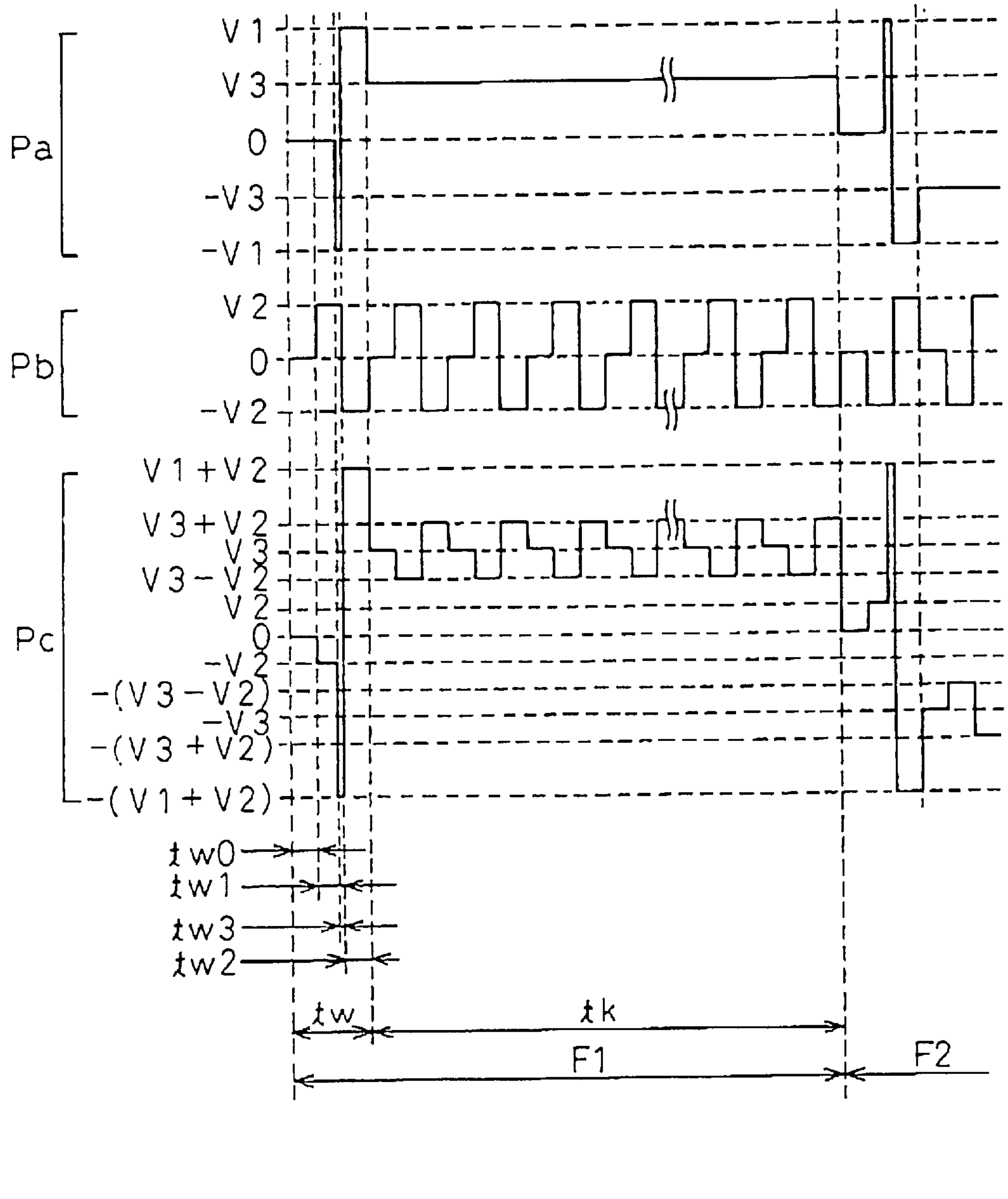
FIG. 9 is a diagram illustrating the driving waveforms for showing a liquid crystal display device, which is a fourth embodiment of the present invention.

FIG. 9 illustrates the fourth embodiment and is a diagram illustrating the driving waveform concerning a pixel of interest. In the case of this embodiment, the present invention is applied to the driving method illustrated in FIG. 4. The selection period tw is divided into the period tw0, the compensation signal period tw1 and the selective driving period tw2, and tw1 and tw2 have equal lengths. Further, the aforesaid period tw0 is utilized as the relaxation period ts. However, the length of the period tw0 may be different from those of the periods tw1 and tw2.

Similarly as in the case of the first to third embodiments, the precedent driving period tw3 may be provided by using any method of the following:

(a) The period tw3 is provided in such a way as to precede the selective driving period tw2 by utilizing all of the compensation signal period tw1.

(b) The period tw3 is provided in such a way as to precede the selective driving period tw2 by utilizing a part of the compensation signal period tw1.

(c) The period tw3 is newly provided in such a way as to precede the selective driving period tw2 and to be posterior to the compensation signal period tw1. The embodiment of FIG. 9, however, adopts the aforementioned method (b), by which the precedent driving period tw3 is provided as a part of the compensation signal period tw1, and sets the value of the scanning signal voltage in the aforesaid precedent driving period tw3 at |V1|.

The voltage levels, which are represented by the scanning signal and the display signals in the time periods tw0, (tw1−tw3), tw3, tw2 and the holding period tk in the first frame are as listed hereinbelow.

| Time Period | tw0 | tw1−tw3 | tw3 | tw2 | tk |
|---|---|---|---|---|---|
| Scanning Signal Voltage | 0 | 0 | −V1 | +V1 | +V3 |
| On-State Display Signal Voltage | 0 | +V2 | +V2 | −V2 | * |
| Off-State Display Signal Voltage | 0 | −V2 | −V2 | +V2 | * |

In this case, the length of the precedent driving period tw3 is set so that the rise time of the optical transmittance in the aforesaid period tw2 is minimized in the case when the display signal voltage is +V2 in the compensation signal period tw1, and is −V2 in the selective driving period tw2. In this case, the voltages V4 and V1 are set so that |V4|=|V1|. Consequently, the number of necessary power supplies can be reduced.

In the case of the aforementioned embodiments, the selection voltage is applied in the period tw2. However, the present invention can be practiced in the case that the selection voltage is applied in the period tw.

Figure 10:
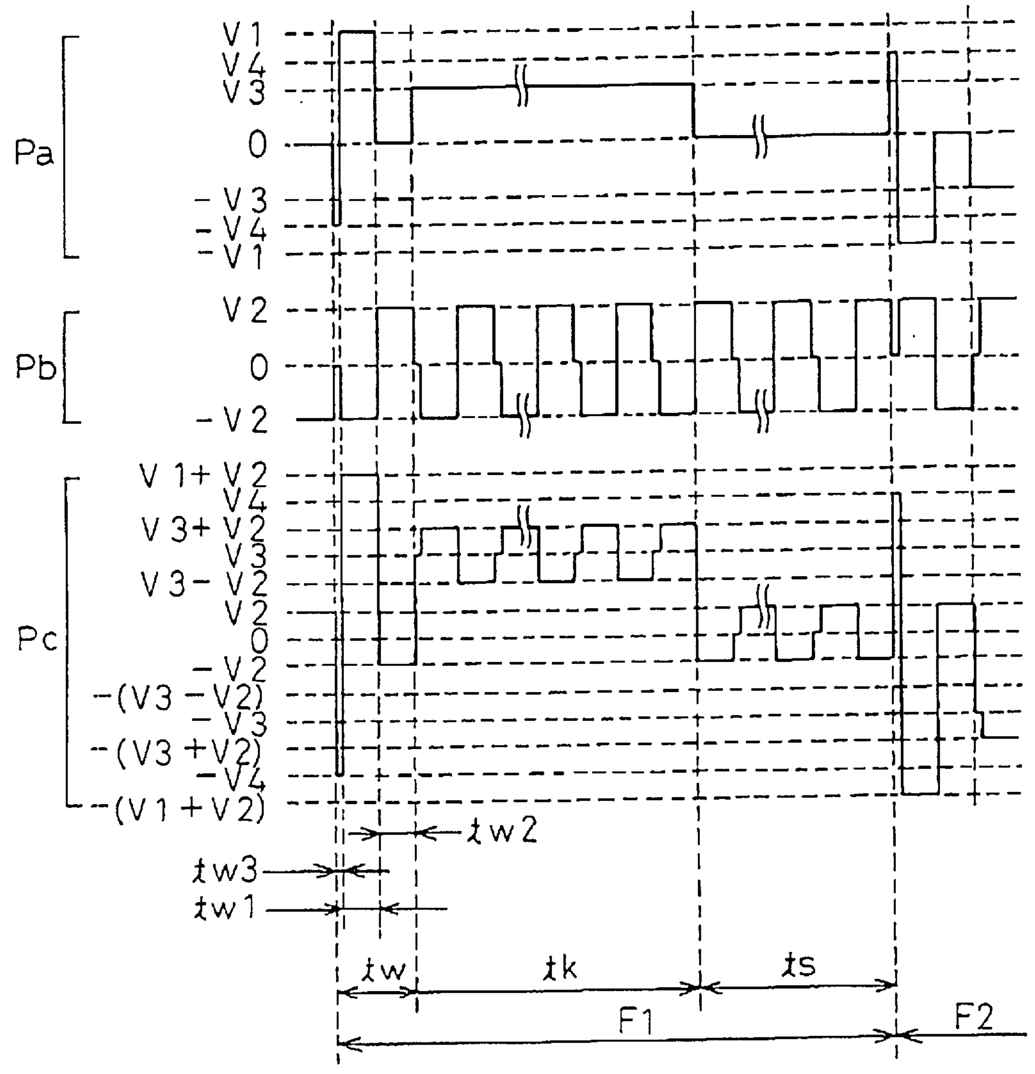
FIG. 10 is a diagram illustrating the driving waveforms for showing a liquid crystal display device, which is a fifth embodiment of the present invention.

FIG. 10 is a driving waveform diagram for illustrating the fifth embodiment. In the case of this embodiment, the selection voltage is applied in the period tw1. Further, the precedent driving period tw3 is provided in such a manner as to precede the aforesaid period tw1.

The voltage levels, which are represented by the scanning signal and the display signals in the time periods tw3, tw1, tw2, the holding period tk and the relaxation period ts in the first frame, are as listed hereinbelow.

| Time Period | tw3 | tw1 | tw2 | tk | ts |
|---|---|---|---|---|---|
| Scanning Signal Voltage | −V4 | +V1 | Vj | V3 | 0 |
| On-State Display Signal Voltage | 0 | −V2 | +V2 | * | * |
| Off-State Display Signal Voltage | 0 | +V2 | −V2 | * | * |

In this case, the length of the precedent driving period tw3 may be set at an arbitrary value. However, it is preferable that the length of the period tw3 is reduced to the least possible length. The value of |V4| is set on the basis of the first means so that the rise time of the optical transmittance in the aforesaid period tw1 is minimized in the case when the display signal voltage is −V2 in the selective driving period tw1, and is +V2 in the compensation signal period tw2. Similarly as in the aforementioned case, the length of the period tw3 may be established by setting the voltage V4 and V1 so that |V4|=|V1|.

Moreover, a scanning signal voltage Vj used in the compensation signal period tw2 can have any value by which |Vj+V2| does not exceed the ferroelectric threshold voltage |Ft|. However, it is convenient to set the voltage Vj at 0 as indicated by solid lines in FIG. 10, or at a value which is equal to the holding voltage V3 as indicated by dashed lines. This is because the number of power supplies does not increase.

The embodiment illustrated in FIG. 10 can easily obtain the linearity in the case of effecting the gray scale display, similarly as in the case of the embodiment illustrated in FIG. 9.

In FIG. 10, the frame F1 is illustrated in such a manner as to begin at the start time of the precedent driving period tw3. However, the frame F1 may be redefined as beginning from the time of expiration of the precedent driving period tw3, by viewing from a different angle. In this case, the aforesaid period tw3 is established at the end of the relaxation period ts. However, even in such a case the period tw3 is still precedent to the selective driving period tw1.

If the length of the period tw2 is sufficient for obtaining the maximum bright state and further has lead time therefor in the first to fifth embodiments, the value of the aforementioned synthetic voltage in the selective driving period is set in such a manner that the rise time of the optical transmittance at the time of displaying the maximum bright state in the selective driving period is nearly equal to the aforesaid selective driving period. Thereby, loads imposed on the drive circuits can be reduced or the power required for driving can be decreased by lowering the values of the voltages of |V1|, |V2| and so on.

Next, as a result of studying the optical transmittance curve of FIG. 5 of the liquid crystal panel used for practicing the present invention in detail by changing temperature, the inventors of the present invention have verified that the voltage |VM| has a temperature dependency.

Figure 11:
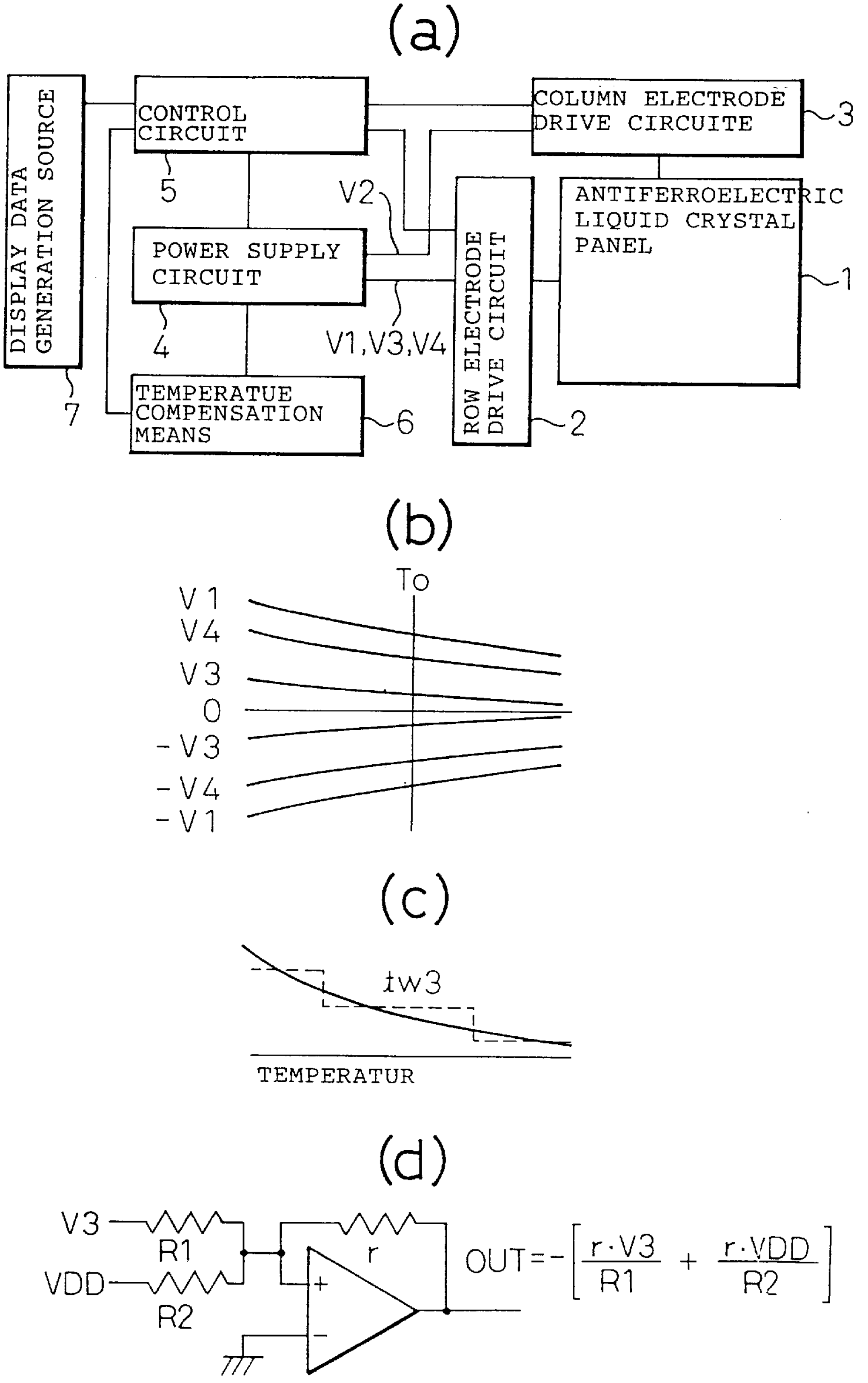
FIGS. 11(*a*), 11(*b*), 11(*c*) and 11(*d*) illustrate a block diagram and a characteristic diagram for showing a liquid crystal display device, which is a sixth embodiment of the present invention.

FIG. 11 illustrates the sixth embodiment of the present invention. FIG. 11(*a*) is a block diagram illustrating the configuration of a circuit for varying the value of a scanning signal voltage in response to change in the temperature. FIG. 11(*b*) is a graph illustrating temperature characteristics thereof. In FIG. 11(*a*), row electrodes, to which scanning signals of the antiferroelectric liquid crystal panel 1 are applied, are connected to a row electrode drive circuit 2. Further, column electrodes, to which display signals are applied, are connected to a column electrode circuit 3. The voltages ±V1, ±V3, ±V4 required to drive the row electrodes of the liquid crystal panel are supplied from a power supply circuit 4 to the row electrode drive circuit 2, together with a voltage which is necessary for operating the row electrode drive circuit 2. The voltages +V2 required to drive the column electrodes of the liquid crystal panel is supplied from the power supply circuit 4 to the column electrode drive circuit 3, together with a voltage which is necessary for operating the column electrode drive circuit 3.

Control circuit 5 is operative to supply signals to the row electrode drive circuit 2 and the column electrode drive circuit 3 according to information sent from a display data generating source 7. The row electrode drive circuit 2 and the column electrode drive circuit 3 feed scanning signals, whose signal level is generated from the voltages ±V1, ±V3, ±V4, and display signals, whose signal level is generated from the voltages ±V2, to the liquid crystal panel 1.

Temperature compensation means 6 is operative to detect the temperature of the liquid crystal panel 1 or that in the vicinity thereof, and to cause at least ±V4 to change according to a result of the detection, among ±V1, ±V2, ±V3, ±V4, so that the rise time of the optical transmittance at the time of displaying the maximum bright state in the selective driving period is almost minimized. Incidentally, the voltage |V4| may be set at a constant value (including 0) in the range of temperatures at which the value of |V4| exceed a permissible value, or in the range of temperatures at which the advantages of the present invention cannot be obtained within the range of permissible temperatures. Further, at some other voltages, the polarity of the voltage V4 may vary with the range of temperatures.

FIG. 11(*b*) illustrates the case that the voltage |V4| in the precedent driving period, the voltage |V1| in the selective driving period and the voltage |V3| in the holding period of the scanning signal are changed depending upon temperature by the temperature compensation means of the aforementioned configuration of FIG. 11(*a*). Electric potential corresponding to V4 falls with a rise in the temperature. In contrast, electric potential corresponding to (−V4) rises with the rise in the temperature.

In this case, it is considered that at low temperatures, the optimum value of |V4| becomes too large and exceeds the value of |V1|. At such temperatures, the voltages may be set in such a manner that |V4|=|V1|. If the advantages of the present invention cannot be obtained as a result, the voltage |V4| may be set so that |V4|=0. Furthermore, in the case of the embodiments of FIGS. 7 and 8, the optimum voltage may be reduced by changing the length of the period tw3.

FIG. 11(*c*) illustrates the case that the temperature compensation is finely performed on the length of the period tw3 in the embodiments of FIGS. 7, 8 and 9. As indicated by dashed lines, the temperature compensation may be performed coarsely thereon by using a suitable temperature range. Needless to say, the temperature compensation may be simultaneously performed on the values of |V1|, |V2|, |V4|.

Characteristic diagrams illustrated in FIGS. 11(*b*) and 11(*c*) are not fixed ones. When using the liquid crystal panels of different characteristics, the voltage corresponding to each temperature has a different optimum value. Thus, it is natural that individual values thereof and the relative relation therebetween are different. Needless to say, optimum temperature compensation, which is suited to the characteristic of the liquid crystal panel, is performed. However, it has been verified that in the case of the liquid crystal panels used in the device of the present invention, there is a strong correlation between a change in the optimum voltage of |V4|, which is caused owing to a temperature, and a change in the ferroelectric threshold voltage |Ft| of the liquid crystal, the ferroelectric saturation voltage |FS|, the antiferroelectric threshold voltage |At| and the antiferroelectric saturation voltage |As|, which is caused due to a change in temperature. Further, the optimum value of each of the selection voltage |V1|, the maximum display signal voltage |V2|, the holding voltage |V3| etc. at each temperature are closely related to the temperature characteristics of the threshold voltage and the saturation voltage thereof. Namely, the optimum |V4| has a close connection with the optimum voltage values of the aforementioned selection voltage |V1|, the maximum display signal voltage |V2|, the holding voltage |V3| etc. through the temperature characteristics of each of the threshold voltages and the saturation voltages.

Thus, in the case that simultaneously with the temperature compensation of the voltage |V4|, the temperature compensation is performed on other voltage values, the configuration of the temperature compensation circuit can be simplified by performing the temperature compensation of |V4| in such a manner as to have certain relation to the aforesaid other voltages.

The inventors of the present invention have made an investigation on the relation between the optimum value of |V4| at each temperature and the optimum other voltages. Consequently, the inventors of the present invention have verified that relatively good results are obtained by using the following approximations:

$$|V4|=|V1/k1+\gamma1|,$$

$$|V4|=|V2/k2+\gamma2| \text{ or}$$

$$|V4|=|V3/k3+\gamma3|$$

$$(|\gamma1|\geqq 0,\ |\gamma2|\geqq 0,\ |\gamma3|\geqq 0)$$

FIG. 11(*d*) shows a part of a circuit for obtaining |V4| by using the approximation |V4|=|V3/k3+γ3|. Further, r, R1 and R2 should be set in such a way that the following equations are satisfied:

$$(R1/\gamma)=k3,$$

$$(VDD\cdot r)/R2=\gamma3$$

where VDD designates a power supply voltage.

As above stated, this invention can be practiced by a driving method which differs from the driving methods disclosed in the foregoing descriptions of the embodiments. For example, in the descriptions of the aforementioned embodiments, it has been described that the compensation signal period is equal to the selective driving period. However, if decreasing the length of the compensation signal period, increasing the absolute value of the display signal voltage in the compensation signal period and equivalently compensating for the influence exerted by the display signal, which is used in the selective driving period, upon another row, the width of the selective driving period can be increased by that amount or the length of the selection period can be further decreased. Consequently, the problems can be solved more easily.

The foregoing description includes a part based on an hypothesis, however the present invention is based on the results of the investigation illustrated in FIG. 5. Therefore, the truth of the hypothesis has no effect on the present invention.

We claim:

1. A method of obtaining an optimum precedent driving voltage |VM|, at which a ferroelectric saturation time tr is minimized, in a synthetic voltage applied in a precedent driving period in an antiferroelectric liquid crystal display device comprising:

a liquid crystal display panel, in which N row electrodes and M column electrodes are formed as a matrix, for effecting a display by using a plurality of pixels arranged in a matrix configuration by means of said N row electrodes and said M column electrodes, row electrode drive means for applying scanning signals to said row electrodes, and column electrode drive means for supplying display signals to said column electrodes, wherein scanning signals having selective driving periods, during which selection voltages are applied in a selection period for determining a display state, are supplied to said row electrodes sequentially, wherein synthetic voltages synthesized from said scanning signals and said display signals are applied to said liquid crystal pixels to thereby perform a display operation, wherein a precedent driving period, which is precedent and adjacent to the selective driving period, is established therein, and wherein said row electrode drive means supplies a scanning signal to each of said row electrodes so that the polarity of the synthetic voltage applied to liquid crystals in said precedent driving period is different from the polarity of the synthetic voltage applied to said liquid crystals in the selective driving period, said method comprising the steps of:

applying a voltage, whose voltage value is |Vx|, in the precedent driving period, applying a voltage, which is different in polarity from the voltage value |Vx| and has a voltage value |Vz|, in the selective driving period, applying a voltage 0 in other periods, and setting a value of the voltage |Vx|, at which the ferroelectric saturation time tr is minimized when changing the value of the voltage |Vx| while maintaining the voltage |Vz| at a constant value, as an optimum precedent driving voltage |VM|.

2. An antiferroelectric liquid crystal display device comprising: a liquid crystal display panel, in which N row electrodes and M column electrodes are formed as a matrix, for effecting a display by using a plurality of pixels arranged in a matrix configuration by means of said N row electrodes and said M column electrodes; row electrode drive means for applying scanning signals to said row electrodes; and column electrode drive means for supplying display signals to said column electrodes, wherein scanning signals having selective driving periods, during which selection voltages are applied in a selection period for determining a display state, are supplied to said row electrodes sequentially, wherein synthetic voltages synthesized from said scanning signals and said display signals are applied to said liquid crystal pixels to thereby perform a display operation, wherein a precedent driving period, which is precedent and adjacent to the selective driving period, is established therein, and wherein said row electrode drive means supplies a scanning signal to each of said row electrodes so that the polarity of the synthetic voltage applied to liquid crystals in said precedent driving period is different from the polarity of the synthetic voltage applied to said liquid crystals in the selective driving period and so that a synthetic voltage applied to said liquid crystals in the precedent driving period has a value at which most of said liquid crystals are brought into a state which is immediately before the transition thereof to a ferroelectric state.

3. An antiferroelectric liquid crystal display device comprising: a liquid crystal display panel, in which N row electrodes and M column electrodes are formed as a matrix, for effecting a display by using a plurality of pixels arranged in a matrix configuration by means of said N row electrodes and said M column electrodes; row electrode drive means for applying scanning signals to said row electrodes; and column electrode drive means for supplying display signals to said column electrodes, wherein scanning signals having selective driving periods, during which selection voltages are applied in a selection period for determining a display state, are supplied to said row electrodes sequentially, wherein synthetic voltages synthesized from said scanning signals and said display signals are applied to said liquid crystal pixels to thereby perform a display operation, wherein a precedent driving period, which is precedent and adjacent to the selective driving period, is established therein, wherein said row electrode drive means supplies a scanning signal to each of said row electrodes so that the polarity of the synthetic voltage applied to liquid crystals in said precedent driving period is different from the polarity of the synthetic voltage applied to said liquid crystals in the selective driving period and so that a synthetic voltage applied to said liquid crystals in the precedent driving period is the optimum precedent driving voltage |VM|, and wherein a value of the optimum precedent driving voltage |VM| and a length of the precedent driving period can be regulated.

4. An antiferroelectric liquid crystal display device comprising: a liquid crystal display panel, in which N row electrodes and M column electrodes are formed as a matrix, for effecting a display by using a plurality of pixels arranged in a matrix configuration by means of said N row electrodes and said M column electrodes; row electrode drive means for applying scanning signals to said row electrodes; and column electrode drive means for supplying display signals to said column electrodes, wherein scanning signals having selective driving periods, during which selection voltages are applied in a selection period for determining a display state, are supplied to said row electrodes sequentially, wherein synthetic voltages synthesized from said scanning signals and said display signals are applied to said liquid crystal pixels to thereby perform a display operation, wherein a precedent driving period, which is precedent and adjacent to the selective driving period, is established therein, wherein said row electrode drive means supplies a scanning signal to each of said row electrodes so that the polarity of the synthetic voltage applied to liquid crystals in said precedent driving period is different from the polarity of the synthetic voltage applied to said liquid crystals in the selective driving period and so that a synthetic voltage applied to said liquid crystals in the precedent driving period is the optimum precedent driving voltage |VM|, and wherein a value of the optimum precedent driving voltage |VM| is able to be regulated.

5. An antiferroelectric liquid crystal display device comprising: a liquid crystal display panel, in which N row electrodes and M column electrodes are formed as a matrix, for effecting a display by using a plurality of pixels arranged in a matrix configuration by means of said N row electrodes and said M column electrodes; row electrode drive means for applying scanning signals to said row electrodes; and column electrode drive means for supplying display signals to said column electrodes, wherein scanning signals having selective driving periods, during which selection voltages are applied in a selection period for determining a display state, are supplied to said row electrodes sequentially, wherein synthetic voltages synthesized from said scanning signals and said display signals are applied to said liquid crystal pixels to thereby perform a display operation, wherein a precedent driving period, which is precedent and adjacent to the selective driving period, is established therein, wherein said row electrode drive means supplies a scanning signal to each of said row electrodes so that the polarity of the synthetic voltage applied to liquid crystals in said precedent driving period is different from the polarity of the synthetic voltage applied to said liquid crystals in the selective driving period and so that a synthetic voltage applied to said liquid crystals in the precedent driving period is the optimum precedent driving voltage |VM|, and wherein a length of the precedent driving period is able to be regulated.

6. The antiferroelectric liquid crystal display device according to claim 2, 3, 4 or 5, wherein the display signal applied to said column electrode in the selective driving period has a compensation signal period, in which the display signal is used as a compensation signal, so as to make compensation for influence exerted on liquid crystal pixels on rows other than a selected row, and wherein the precedent driving period is included in a part of said compensation signal period.

7. The antiferroelectric liquid crystal display device according to claim 2, 3, 4 or 5, wherein the display signal applied to said column electrode in the selective driving period has a compensation signal period, in which the display signal is used as a compensation signal, so as to compensate for the influence exerted on liquid crystal pixels on rows other than a selected row, and wherein the precedent driving period is entirely said compensation signal period.

8. The antiferroelectric liquid crystal display device according to claim 2, 3, 4 or 5, wherein the display signal applied to said column electrode in the selective driving period has a compensation signal period, in which the display signal is used as a compensation signal, so as to compensate for the influence exerted on liquid crystal pixels on rows other than a selected row, and wherein the precedent driving period is a time period other than said compensation signal period.

9. The antiferroelectric liquid crystal display device according to claim 2, 3, 4 or 5, wherein a value of the synthetic voltage in said selective driving period is set so that the ferroelectric saturation time tr is almost equal to the selective driving period.

10. The antiferroelectric liquid crystal display device according to claim 2, 3, 4 or 5, which further comprises means for performing temperature compensation according to a change in temperature.

* * * * *

UNITED STATES PATENT AND TRADEMARK OFFICE

CERTIFICATE OF CORRECTION

PATENT NO. : 5,886,755

DATED : March 23, 1999

INVENTOR(S) : Satoshi IMOTO et al.

It is certified that error appears in the above-identified patent and that said Letters Patent is hereby corrected as shown below:

Claim 2, Col. 24, line 5, after "ferroelectric state", insert --and is the optimum precedent driving voltage--.

Signed and Sealed this

Twenty-eighth Day of September, 1999

*Attest:*

Q. TODD DICKINSON

*Attesting Officer* *Acting Commissioner of Patents and Trademarks*